(12) United States Patent
Hong et al.

(10) Patent No.: US 12,140,954 B2
(45) Date of Patent: Nov. 12, 2024

(54) CLEANING ROBOT AND METHOD FOR PERFORMING TASK THEREOF

(71) Applicant: SAMSUNG ELECTRONICS CO., LTD., Suwon-si (KR)

(72) Inventors: Soonhyuk Hong, Suwon-si (KR); Shivam Garg, Suwon-si (KR); Eunseo Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 551 days.

(21) Appl. No.: 16/577,039

(22) Filed: Sep. 20, 2019

(65) Prior Publication Data
US 2020/0097012 A1    Mar. 26, 2020

(30) Foreign Application Priority Data

Sep. 20, 2018  (KR) .................. 10-2018-0113305
Nov. 8, 2018   (KR) .................. 10-2018-0136769

(51) Int. Cl.
*G05D 1/00* (2024.01)
*A47L 9/28* (2006.01)
(Continued)

(52) U.S. Cl.
CPC .......... *G05D 1/0214* (2013.01); *A47L 9/2826* (2013.01); *A47L 11/4011* (2013.01);
(Continued)

(58) Field of Classification Search
CPC ............ G05D 1/0214; G05D 1/0221; G05D 1/0238; G05D 1/0251; G05D 2201/0203;
(Continued)

(56) References Cited

U.S. PATENT DOCUMENTS 7,684,894 B2    3/2010  Sakai et al.
7,751,285 B1 *  7/2010  Cain ................... G04G 9/0017
                                                    368/10
(Continued)

FOREIGN PATENT DOCUMENTS

CN   103479303 A    1/2014
CN   105142482 A   12/2015
(Continued)

OTHER PUBLICATIONS

Communication dated Apr. 15, 2021, from the European Patent Office in European Application No. 19861532.0.
(Continued)

*Primary Examiner* — Bhavesh V Amin
(74) *Attorney, Agent, or Firm* — Sughrue Mion, PLLC

(57) ABSTRACT

A method for performing a task of a cleaning robot is provided. The method according to an embodiment includes generating a navigation map for driving the cleaning robot using a result of at least one sensor detecting a task area in which an object is arranged, obtaining recognition information of the object by applying an image of the object captured by at least one camera to a trained artificial intelligence model, generating a semantic map indicating environment of the task area by mapping an area of the object included in the navigation map with the recognition information of the object, and performing a task of the cleaning robot based on a control command of a user using the semantic map. An example of the trained artificial intelligence model may be a deep-learning neural network model in which a plurality of network nodes having weighted values are disposed in different layers and exchange data according to a convolution relationship, but the disclosure is not limited thereto.

10 Claims, 42 Drawing Sheets

(51) Int. Cl.
*A47L 11/40* (2006.01)
*G01S 15/931* (2020.01)
*G01S 17/931* (2020.01)

(52) U.S. Cl.
CPC ......... *A47L 11/4061* (2013.01); *G01S 15/931* (2013.01); *G01S 17/931* (2020.01); *G05D 1/0221* (2013.01); *G05D 1/0238* (2013.01); *G05D 1/0251* (2013.01); *A47L 2201/04* (2013.01)

(58) Field of Classification Search
CPC ............... G05D 1/0044; A47L 9/2826; A47L 11/4011; A47L 11/4061; A47L 2201/04; A47L 9/2805; A47L 9/2847; A47L 9/2852; A47L 9/2889; A47L 2201/06; G01S 15/931; G01S 17/931; G01S 17/88; G01S 15/86; G01S 17/86; G01S 17/89; G01S 17/10
See application file for complete search history.

(56) References Cited

U.S. PATENT DOCUMENTS

| | | | |
|---|---|---|---|
| 8,983,661 B2 | 3/2015 | Cho et al. | |
| 9,002,520 B2 | 4/2015 | Hong et al. | |
| 9,226,632 B2 | 1/2016 | Cho et al. | |
| 9,375,119 B2* | 6/2016 | Lee | G08B 13/19613 |
| 9,436,186 B2* | 9/2016 | Oh | G05B 15/00 |
| 9,511,494 B2 | 12/2016 | Noh et al. | |
| 9,574,883 B2* | 2/2017 | Watts | H04L 9/3278 |
| 9,597,804 B2* | 3/2017 | Yoon | A47L 11/4011 |
| 9,675,226 B2* | 6/2017 | Kim | G05D 1/0044 |
| 9,717,387 B1* | 8/2017 | Szatmary | A47L 9/2805 |
| 9,983,592 B2* | 5/2018 | Hong | G05D 1/0016 |
| 10,052,004 B2* | 8/2018 | Kim | A47L 9/2894 |
| 10,058,224 B2* | 8/2018 | Kim | A47L 11/4013 |
| 10,265,858 B2* | 4/2019 | Yoon | B25J 9/1697 |
| 10,327,617 B2* | 6/2019 | Kim | G05D 1/0033 |
| 10,328,934 B2* | 6/2019 | Minster | G06T 7/00 |
| 10,518,416 B2 | 12/2019 | Haegermarck | |
| 10,606,269 B2* | 3/2020 | Millard | G05D 1/0221 |
| 10,660,496 B2* | 5/2020 | Han | A47L 9/2852 |
| 10,809,065 B2 | 10/2020 | Helmich | |
| 10,852,729 B2 | 12/2020 | Choi et al. | |
| 11,267,131 B2* | 3/2022 | Park | G05D 1/0246 |
| 11,269,343 B2* | 3/2022 | Park | A47L 11/4061 |
| 2003/0109938 A1* | 6/2003 | Daum | H04L 12/2818 340/3.1 |
| 2004/0034533 A1* | 2/2004 | Park | G05D 1/0033 704/275 |
| 2006/0184274 A1 | 8/2006 | Sakai et al. | |
| 2007/0250212 A1* | 10/2007 | Halloran | A47L 9/0466 901/1 |
| 2009/0276218 A1* | 11/2009 | Hussey | G10L 13/00 704/275 |
| 2011/0145000 A1* | 6/2011 | Hoepken | G10L 15/22 704/275 |
| 2011/0205338 A1* | 8/2011 | Choi | G06T 7/74 348/46 |
| 2013/0056032 A1* | 3/2013 | Choe | G05D 1/0044 15/3 |
| 2013/0060379 A1* | 3/2013 | Choe | B60L 50/52 700/245 |
| 2013/0326839 A1 | 12/2013 | Cho et al. | |
| 2014/0064623 A1 | 3/2014 | Kang et al. | |
| 2014/0116469 A1* | 5/2014 | Kim | A47L 11/4061 15/319 |
| 2014/0156076 A1* | 6/2014 | Jeong | B25J 9/0003 700/257 |
| 2014/0167931 A1* | 6/2014 | Lee | H04L 12/2818 340/12.5 |
| 2014/0207280 A1* | 7/2014 | Duffley | A47L 11/4011 700/257 |
| 2014/0207281 A1* | 7/2014 | Angle | B25J 13/006 700/257 |
| 2014/0207282 A1* | 7/2014 | Angle | H04L 67/62 901/1 |
| 2014/0316636 A1* | 10/2014 | Hong | G05D 1/0016 901/1 |
| 2014/0324271 A1* | 10/2014 | Oh | G05D 1/0274 701/28 |
| 2014/0350839 A1* | 11/2014 | Pack | G05D 1/0231 901/1 |
| 2015/0019215 A1* | 1/2015 | Shin | G10L 15/20 704/275 |
| 2015/0032260 A1* | 1/2015 | Yoon | G05D 1/0016 700/257 |
| 2015/0120060 A1* | 4/2015 | Yamashita | B25J 11/0005 704/270.1 |
| 2015/0148959 A1 | 5/2015 | Cho et al. | |
| 2015/0149175 A1* | 5/2015 | Hirata | G10L 15/30 704/246 |
| 2015/0233135 A1* | 8/2015 | Hui | G05D 1/0219 134/18 |
| 2016/0022107 A1* | 1/2016 | Kim | G06V 20/10 901/1 |
| 2016/0052133 A1* | 2/2016 | Kim | G05D 1/0016 901/1 |
| 2016/0121482 A1* | 5/2016 | Bostick | G01S 19/47 901/1 |
| 2016/0154996 A1* | 6/2016 | Shin | G06V 40/28 901/1 |
| 2016/0188977 A1* | 6/2016 | Kearns | G06V 40/172 348/113 |
| 2016/0274579 A1* | 9/2016 | So | G05D 1/2235 |
| 2016/0291595 A1* | 10/2016 | Halloran | A47L 11/40 |
| 2016/0372138 A1* | 12/2016 | Shinkai | G10L 25/66 |
| 2017/0079496 A1* | 3/2017 | Kim | A47L 9/2894 |
| 2017/0079497 A1* | 3/2017 | Kim | A47L 11/4011 |
| 2017/0079498 A1* | 3/2017 | Kim | G05D 1/0022 |
| 2017/0144311 A1* | 5/2017 | Yoon | B25J 9/1697 |
| 2017/0156560 A1 | 6/2017 | Jung et al. | |
| 2017/0185085 A1 | 6/2017 | Storfer et al. | |
| 2017/0197315 A1 | 7/2017 | Haegermarck | |
| 2017/0235312 A1 | 8/2017 | Yoshino | |
| 2017/0242442 A1* | 8/2017 | Minster | B60W 30/09 |
| 2017/0273527 A1* | 9/2017 | Han | G05D 1/0044 |
| 2017/0312916 A1 | 11/2017 | Williams et al. | |
| 2017/0361468 A1* | 12/2017 | Cheuvront | G06F 3/16 |
| 2018/0200884 A1 | 7/2018 | Perets et al. | |
| 2018/0210445 A1 | 7/2018 | Choi et al. | |
| 2018/0348783 A1* | 12/2018 | Pitzer | G06V 20/20 |
| 2018/0353042 A1* | 12/2018 | Gil | G06V 10/82 |
| 2019/0025061 A1 | 1/2019 | Helmich | |
| 2019/0187703 A1* | 6/2019 | Millard | G05D 1/0088 |
| 2019/0320867 A1 | 10/2019 | Noh et al. | |
| 2020/0012292 A1* | 1/2020 | Park | A47L 11/4011 |
| 2020/0097012 A1* | 3/2020 | Hong | A47L 11/4011 |

FOREIGN PATENT DOCUMENTS

| | | |
|---|---|---|
| CN | 105796002 A | 7/2016 |
| CN | 106415423 A | 2/2017 |
| CN | 107000207 A | 8/2017 |
| CN | 108431714 A | 8/2018 |
| JP | 4555035 B2 | 9/2010 |
| KR | 10-0425695 B1 | 4/2004 |
| KR | 10-0773184 B1 | 11/2007 |
| KR | 10-2008-0089148 A | 10/2008 |
| KR | 10-1049155 B1 | 7/2011 |
| KR | 10-2012-0114670 A | 10/2012 |
| KR | 10-1280908 B1 | 7/2013 |
| KR | 20150014237 A | 2/2015 |
| KR | 10-2015-0142475 A | 12/2015 |
| KR | 10-2016-0023428 A | 3/2016 |
| KR | 10-1786516 B1 | 10/2017 |
| KR | 10-2018-0023302 A | 3/2018 |
| KR | 10-2018-0023303 A | 3/2018 |
| KR | 10-2018-0087798 A | 8/2018 |

(56) References Cited

FOREIGN PATENT DOCUMENTS

| WO | 2014/175605 A1 | 10/2014 |
| WO | 2015016580 A1 | 2/2015 |
| WO | 2018/097574 A1 | 5/2018 |

OTHER PUBLICATIONS

International Search Report (PCT/ISA/210), issued by International Searching Authority in corresponding International Application No. PCT/KR2019/012206, on Dec. 20, 2019.
Written Opinion (PCT/ISA/237) issued by the International Searching Authority in corresponding International Application No. PCT/KR2019/012206, on Dec. 20, 2019.
Communication issued Feb. 17, 2023 by the European Patent Office in counterpart European Patent Application No. 19861532.0.
Communication issued May 6, 2023 by the Korean Intellectual Property Office in counterpart Korean Patent Application No. 10-2018-0136769.
Communication issued Sep. 24, 2023 by the Korean Patent Office for KR Patent Application No. 10-2018-0136769.
Office Action issued on Oct. 25, 2023 by the Chinese Patent Office in corresponding CN Patent Application No. 201980060566.4.
Communication issued Jan. 22, 2024 by the Korean Intellectual Property Office in Korean Patent Application No. 10-2018-0136769.
Communication issued on Apr. 18, 2024 by the China National Intellectual Property Administration for Chinese Patent Application No. 201980060566.4.
Office Action issued Aug. 13, 2024 in Korean Application No. 10-2024-0053615.

* cited by examiner

FIG. 5A
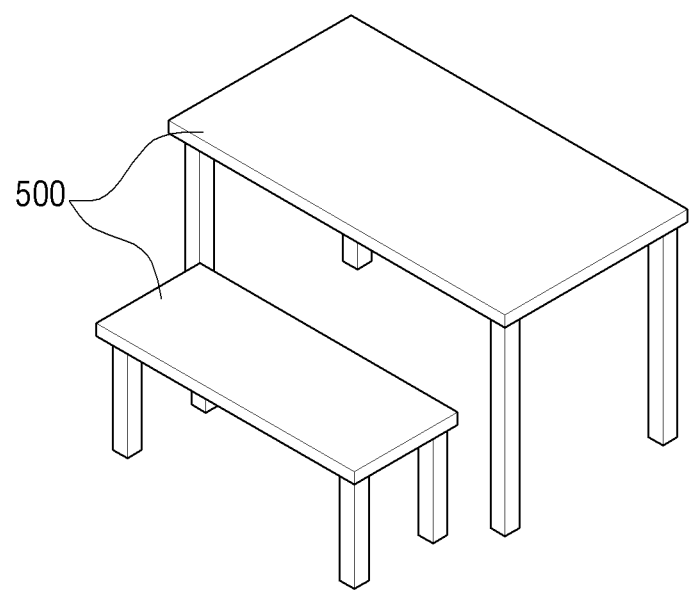
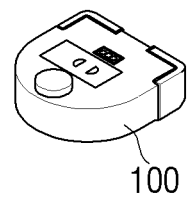

(a)  (b)

(a)                           (b)

(a)  (b)

FIG. 26B
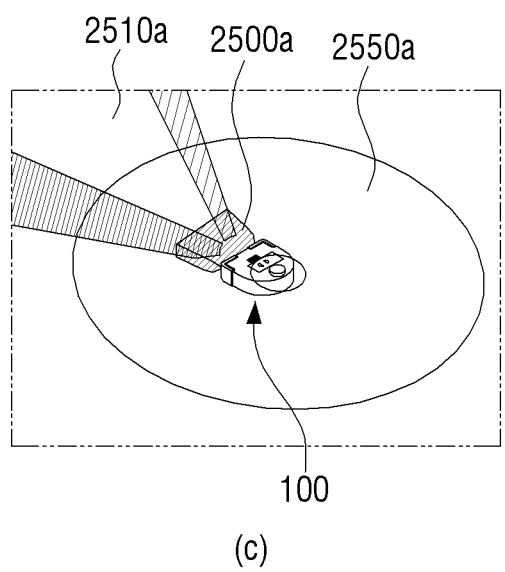
(c)
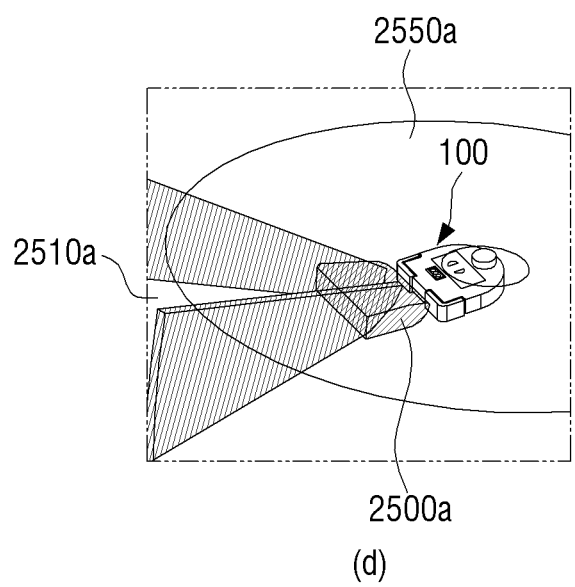
(d)

CLEANING ROBOT AND METHOD FOR PERFORMING TASK THEREOF

CROSS-REFERENCE TO RELATED APPLICATIONS

This application claims priority from Korean Patent Application No. 10-2018-0113305, filed on Sep. 20, 2018, and Korean Patent Application No. 10-2018-0136769, filed on Nov. 8, 2018, each filed in the Korean Intellectual Property Office, the disclosures of which are incorporated herein by reference in their entireties.

BACKGROUND

1. Field of the Invention

Devices and methods consistent with what is disclosed herein relate to a cleaning robot and a task method thereof, and more particularly, to a cleaning robot for providing an appropriate task using information on objects (e.g., obstacles) near the cleaning robot and a controlling method thereof.

2. Description of the Related Art

With the development of robot technology, robots have been commonly used in homes as well as in a specialized technical field or industry requiring a significant amount of workforces. Specifically, service robots for providing housekeeping services to users, cleaning robots, pet robots, etc. have been widely used.

Particularly, in the case of a cleaning robot, it is significantly important to specifically identify information on objects such as foreign substances, structures, obstacles, etc. near the cleaning robot in depth, and perform a task suitable for each object. However, a conventional cleaning robot is limited to obtain detailed information of the object due to the limited combination of sensors. In other words, the conventional cleaning robot has no information about what kind of object it is, but drives to avoid objects in the same pattern solely depending on the detection capability (capability of sensing) of the sensor.

Accordingly, it is required to identify an object near the cleaning robot, determine a task suitable for the object that can be performed by the cleaning robot, and drive the cleaning robot or avoid objects more effectively.

SUMMARY

An aspect of the exemplary embodiments relates to providing a cleaning robot for providing a service for performing a task suitable for a peripheral object using a plurality of sensors of the cleaning robot, and a controlling method thereof.

According to an exemplary embodiment, there is provided a method for performing a task of a cleaning robot, the method including generating a navigation map for driving the cleaning robot based on receiving sensor data from at least one sensor that detects or senses a task area in which an object is arranged, obtaining recognition information of the object by applying an image of the object captured by at least one camera to a trained artificial intelligence model, generating a semantic map indicating environment of the task area by mapping an area of the object included in the navigation map with the recognition information of the object, and performing a task of the cleaning robot based on a control command of a user using the semantic map.

According to an exemplary embodiment, there is provided a cleaning robot including at least one sensor, a camera, and at least one processor configured to generate a navigation map for driving the cleaning robot based on receiving sensor data of the at least one sensor detecting (or sensing) a task area in which an object is arranged, obtain recognition information of the object by applying an image of the object captured by the camera to a trained artificial intelligence model, providing a semantic map indicating environment of the task area by mapping an area of the object included in the navigation map with the recognition information of the object, and perform a task of the cleaning robot based on a control command of a user using the semantic map.

According to the above-described various exemplary embodiments, a cleaning robot may provide a service for performing the most suitable task such as removing or avoiding one or more objects considering recognition information, and/or additional information, etc. of an object (e.g., a nearby object).

According to an exemplary embodiment, there is provided a method including: receiving, by a cleaning robot, a captured image from a camera or sensor of the cleaning robot, transmitting, by the cleaning robot, the captured image to an external server, obtaining, by the external server, recognition result information by inputting the captured image a trained artificial intelligence model, the recognition result information including information on the object, transmitting, by the server, the recognition result information to the cleaning robot, based on mapping an area corresponding to the object included in a navigation map with the recognition information of the object, generating, by the cleaning robot, a semantic map including information indicating a position of the object in the task area in the navigation map, and performing, by the cleaning robot, a task based on a control command of a user using the semantic map.

According to the above-described various exemplary embodiments, a cleaning robot may provide a semantic map indicating environment of a task area. Accordingly, a user may control a task of the cleaning robot by using names, etc. of an object or a place with the provided semantic map, so that usability may be significantly improved.

BRIEF DESCRIPTION OF THE DRAWINGS

FIG. 5A, FIG. 5B, and FIG. 5C are views to explain that a cleaning robot obtains additional information on an object based on a detection result through a LIDAR sensor;

FIG. 26A and FIG. 26B are views illustrating a detection range (sensing range) of a cleaning robot according to an embodiment of the disclosure.

DETAILED DESCRIPTION OF EXEMPLARY EMBODIMENTS

Figure 1:
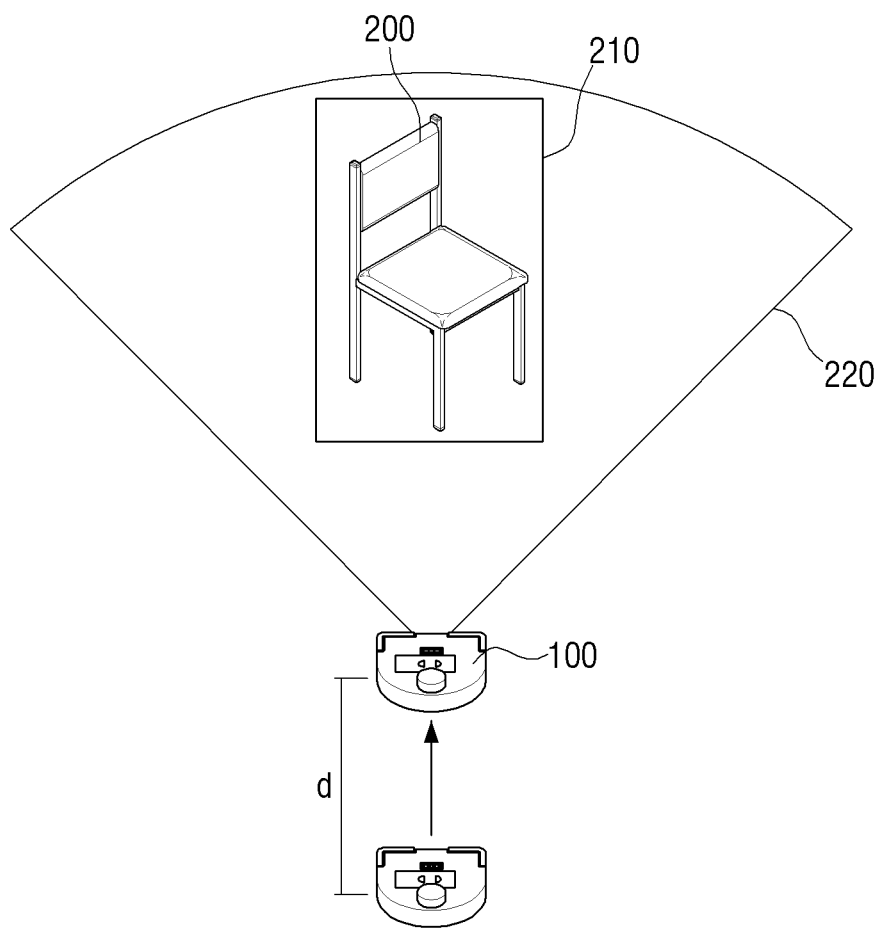
FIG. 1 is a view to explain a method of recognizing and detecting (or sensing) an object of an obstacle of a cleaning robot according to an embodiment of the disclosure.

It is to be understood that the disclosure herein is not intended to limit the scope to the described embodiments, but includes various modifications, equivalents, and/or alternatives of the embodiments. In the description of the drawings, like reference numerals refer to like elements throughout the description of drawings.

Terms such as "first" and "second" may be used to modify various elements regardless of order and/or importance. Those terms are only used for the purpose of differentiating a component from other components. For example, the first user equipment and the second user equipment may represent different user equipment, regardless of order or importance. For example, without departing from the scope of the claims described in this disclosure, the first component may be referred to as a second component, and similarly, the second component may also be referred to as the first component.

When an element (e.g., a first constituent element) is referred to as being "operatively or communicatively coupled to" or "connected to" another element (e.g., a second constituent element), it should be understood that each constituent element is directly connected or indirectly connected via another constituent element (e.g., a third constituent element). However, when an element (e.g., a first constituent element) is referred to as being "directly coupled to" or "directly connected to" another element (e.g., a second constituent element), it should be understood that there is no other constituent element (e.g., a third constituent element) interposed therebetween.

The terminology used herein is for the purpose of describing particular embodiments and is not intended to be limiting the scope of other example embodiments. As used herein, the singular forms are used for convenience of explanation, but are intended to include the plural forms as well, unless the context clearly indicates otherwise. In addition, terms used in this specification may have the same meaning as commonly understood by those skilled in the art. General predefined terms used herein may be interpreted as having the same or similar meaning as the contextual meanings of the related art, and unless expressly defined herein, the terms are not to be construed as an ideal or overly formal sense. In some cases, the terms defined herein may not be construed to exclude embodiments of the disclosure.

Hereinafter, various embodiments of the disclosure will be described in detail with reference to the accompanying drawings. FIG. 1 is a view to explain a method of recognizing and detecting (sensing) an object of an obstacle of a cleaning robot according to an embodiment of the disclosure.

Referring to FIG. 1, a cleaning robot 100 may recognize an object 200 near the cleaning robot. The cleaning robot 100 may be an apparatus that moves by itself and provides a cleaning service to a user, and it could be embodied as various types of electronic apparatuses. For example, the cleaning robot 100 may be embodied in various forms such as a cylindrical shape or a rectangular parallelepiped shape for various purposes, for example, a home cleaning robot, a tall building cleaning robot, an airport cleaning robot, etc. According to an embodiment, the cleaning robot 100 may not only perform a task of removing foreign substances on the floor, but also a task of moving an object according to user's instructions.

The cleaning robot 100 may capture an image including the object 200 through a camera, and input the captured image to an artificial intelligence model trained for recognizing the object in order to recognize an object. The artificial intelligence model may be included in the cleaning robot 100, or in an external server (not shown). The artificial intelligence model may be, for example, a model trained according to a supervised learning method based on an artificial intelligence algorithm, and an unsupervised learning method. As an example of the artificial intelligence model, a neural network model may include a plurality of network nodes having weighted values, and the plurality of network nodes may be positioned in different depths (or layers) to transmit or receive data according to a convolution connection relationship. For example, a Deep Neural Network (DNN), a Recurrent Neural Network (RNN), a Bidirectional Recurrent Deep Neural Network (BRDNN), and the like may be used as the neural network model, but the disclosure is not limited thereto.

When recognizing the object 200 as a specific type of object (e.g., a chair), the cleaning robot 100 may use a sensor other than a red-green-blue (RGB) camera to obtain more specific information on the object 200. To be specific, when the object is the specific type of object (e.g., a chair), the cleaning robot 100 may be preset to use a Light Detection and Ranging (LIDAR) sensor preferentially to obtain information on locations of parts of the specific type of object (e.g., chair legs) or distances between the parts (e.g., legs), or to give a higher weighted value to the result by the LIDAR sensor among results by a plurality of sensors.

The cleaning robot 100 may eject a laser pulse 220 for detecting the object 200 through the LIDAR sensor for specific information on the object 200, which is recognized. The detailed description thereof will be made below.

The cleaning robot 100 may store speed information, object image information and speed information in different positions (e.g., a first position and a second position) of the cleaning robot. The cleaning robot 100 may determine a distance (d) between the first position and the second position based on the stored information and determine the distance from a specific position to the object 200.

The cleaning robot 100 may determine a task to be performed by the cleaning robot 100 regarding the object 200 based on specific information on the locations of parts of a specific object (e.g chair legs), the distances between the parts of the specific object (e.g., chair legs), etc. and the distance information from the object 200 through an additional sensor such as the LIDAR sensor. For example, the cleaning robot 100 may control the moving speed and direction for performing a task of cleaning the space between parts of the specific object (e.g., chair legs) based on information of the distances between the parts of the specific object (e.g., the chair legs).

The cleaning robot 100 may determine a no-go area for the recognized object 200 or a bounding box 210. The cleaning robot 100 may access only up to a no-go area 210 when there is no object recognition through the RGB camera and no additional detection information other than information on the no-go area 210.

In the above-examples, it is exemplified that an object is a chair, and a sensor is a LIDAR sensor, but the disclosure is not limited thereto. Various sensors may be used for various objects.

The cleaning robot 100 may determine tasks differently according to object recognition results. For example, the cleaning robot 100 may perform a function of removing cereal when recognizing the object as cereal, pushing away a cushion when the object recognized is a cushion, and lowering the moving speed to completely avoid a glass cup when recognizing the object as a glass cup, which is fragile so as to be easily broken. In addition, when recognizing the object as a dangerous one, the cleaning robot 100 may capture an image of the object and transmit the image to the user terminal device. When recognizing the object as a dirty one such as a pet's pooh, the cleaning robot 100 may perform a specific recognition for completely avoiding the object, and transmit an image including the object to the user terminal device so as to notify the user of the pet's pooh (or the glass cup).

The cleaning robot 100 may obtain specific information on the object based on the combination of detection (sensing) results by at least one sensor available for determining whether to perform close avoidance driving or complete avoidance driving. The detailed description thereof will be made below.

Figure 2A:
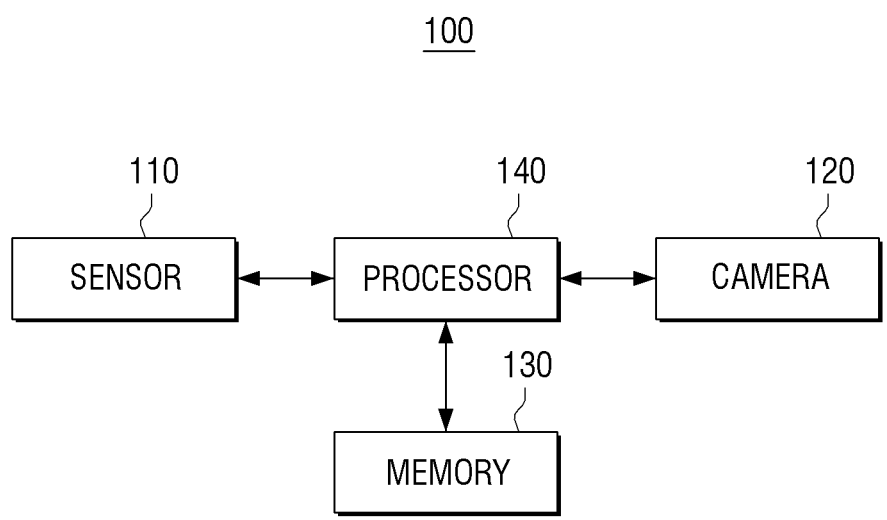
FIG. 2A and FIG. 2B are block diagrams to explain a configuration of a cleaning robot according to an embodiment of the disclosure.

FIG. 2A is a block diagram to explain configuration of a cleaning robot according to an embodiment of the disclosure.

Referring to FIG. 2A, the cleaning robot 100 may include a sensor 110, a camera 120, a memory 130, and a processor 140.

The sensor 110 may include various kinds of sensors. Specifically, the sensor 110 may include an IR stereo sensor, a LIDAR sensor, an ultrasonic sensor, and the like. Each IR stereo sensor, LIDAR sensor, and ultrasonic sensor may be implemented as one sensor, or as a separate sensor.

The IR stereo sensor may detect the three dimensional shape of an object and distance information. The IR stereo sensor may obtain three-dimensional (3D) depth information of the object, which may include length, height and width information. However, the IR stereo sensor has the disadvantage of not detecting black, transparent, or metal color.

The cleaning robot 100 may obtain a two-dimensional (2D) line shape of an object and distance information using a LIDAR sensor. Therefore, the cleaning robot 100 may obtain information on the space for the object and the distance information on nearby objects. However, the LIDAR stereo sensor has the disadvantage of not detecting black, transparent, or metal color.

The ultrasonic sensor may obtain distance information on obstacles. The ultrasonic sensors has a disadvantage of a relatively limited sensing range, but has an advantage of detecting black, transparent, or metal color.

In addition, the sensor 110 may include sensors for detecting surroundings such as a dust sensor, an odor sensor, a laser sensor, an ultra-wide band (UWB) sensor, an image sensor, an obstacle sensor, and sensors for detecting a moving state such as a gyro sensor, a global positioning system (GPS) sensor, and the like. The sensors for detecting the surroundings and the sensors for detecting the moving state of the cleaning robot may be implemented with different configurations or with a single configuration. The sensor 110 may further include various kinds of sensors, and some of the sensors may not be included according to the task performed by the cleaning robot 100.

The camera 120 may be configured to capture a peripheral image of the cleaning robot 100 from various aspects. The camera 120 may capture a front image of the cleaning robot 100 through an RGB camera, or images in other directions that the driving direction. The camera 120 may be provided in the cleaning robot 100 independently, or included in an object recognition sensor as part of it.

The camera 120 may include a plurality of cameras. The camera 120 may be installed on at least one of the upper part or the front part of the cleaning robot 100.

The memory 130 may store the image captured by the camera 120 and moving state information and may capture direction information of the cleaning robot 100 at the time of capturing. The memory 130 may store navigation map information for placing the cleaning robot 100 for performing a task by the cleaning robot 100. However, the disclosure is not limited thereto, and the memory 130 may store various programs required for operating the cleaning robot 100.

The memory 130 may store a plurality of application programs and/or applications driven by the cleaning robot 100, and data commands, etc. for operating the cleaning robot 100. Part of the application programs may be downloaded from an external server through wireless communication. At least part of the application programs may be set in the cleaning robot 100 for a basic function when released. The application programs may be stored in the memory 130, and cause the cleaning robot 100 to operate (or function).

As various embodiment examples, the memory 130 may generate a navigation map for driving the cleaning robot 100 using the result of at least one sensor detecting a task area in which an object is arranged, obtain recognition information of the object by applying the image of the objet captured by at least one camera to the trained artificial intelligence model, map the area of the object included in the navigation map with the recognition information of the object, and store at least one instruction set to generate a semantic map indicating environment of the task area.

The memory 130 may store at least one instruction so that the processor 140 may capture an image of an object near the cleaning robot, obtain recognition information of the object included in the image by applying the captured image to the trained artificial intelligence model, detect the object by using at least one sensor selected based on the obtained recognition information of the object, and obtain the additional information on the object using the result detected by at least one sensor.

The memory 130 may be embodied with at least one of: a non-volatile memory, a volatile memory, a flash-memory, a hard disk drive (HDD) or a solid state drive (SDD). The memory 130 may be accessed by the processor 140, and any of reading/writing/modifying/deleting/updating of data (e.g., data stored in the memory) may be performed by the processor 140. According to the present disclosure, the term 'a memory' may include the memory 130, read-only memory (ROM) (not shown) or random access memory (RAM) (not shown) in the processor 140, or a memory card (not shown) (e.g., a micro SD card, a memory stick, etc.) mounted in the cleaning robot 100.

The processor 140 may control the overall operation of the cleaning robot 100. For example, the processor 140 may control the camera 120 to capture an image near the cleaning robot 100. The processor 140 may include RAM and ROM, or a system may include the ROM and RAM and the processor 140. The ROM may store a command set for system booting. The CPU 141 may copy the operating system (O/S) stored in the cleaning robot 100 to the RAM according to a command stored in the ROM, and execute the O/S to perform system booting. When the system booting is completed, the CPU 141 may copy various programs stored in the memory 130 to the RAM, execute the programs copied to the RAM, and perform various operations.

Figure 2B:
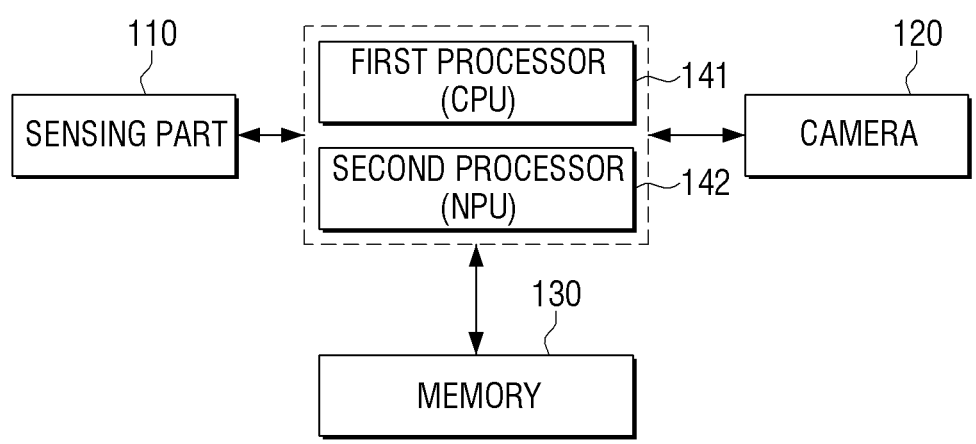

According to an embodiment, referring to FIG. 2B, the cleaning robot 100 may include a plurality of processors 141 and 142. The plurality of processor 141 and 142 may include a central processing unit (CPU) 141 and a neural processing part (NPU) 142. The NPU 142 may be an optimized specific processor for recognizing an object by using the trained artificial intelligence model. The NPU (and/or the CPU) of the cleaning robot 100 may include at least one of a digital signal processor (DSP) for processing digital signals, a microprocessor, a time controller (TCON), a microcontroller unit (MCU), a micro processing unit (MPU), an application processor (AP), a communication processor (CP), or an ARM processor, or the like, or may be defined by different combinations of the corresponding terms. The processor 140 may be implemented as a system on chip (SoC), a large scale integration (LSI) with a built-in processing algorithm, or in the form of a field programmable gate array (FPGA).

The processor 140 may recognize obstacles included in the image through the artificial intelligence model trained to recognize objects such as the obstacles. The processor 140 may input an image including the obstacles to the artificial intelligence model, and obtain the output result including information on the types of obstacles. The processor 140 may determine the size of the no-go area which is different upon the types of obstacles. The no-go area may be an area including the obstacles, and may be an area not to be accessed by the cleaning robot 100 performing a cleaning task.

The artificial intelligence model may be trained and stored in the memory 130 of the cleaning robot 100 as an on device type, or stored in an external server. The detailed description thereof will be made below. Hereinafter, an embodiment in which an artificial intelligence model is stored in the cleaning robot 100 will be exemplified.

The processor 140 may generate a second image obtained by overlapping the no-go area for the recognized obstacle with the first image. The processor 140 may recognize locations of the structures and obstacles near the cleaning robot 100 based on information included in the second image, and determine the direction and speed of driving of the cleaning robot 100. The processor 140 may control the driver 110 to move the cleaning robot 100 according to the determined moving direction and speed.

The processor 140 may generate the first image of the bottom, which is characteristically divided from the captured image. The processor 140 may use an image division method for dividing the bottom image.

The processor 140 may generate a navigation map for driving the cleaning robot 100 based on the result of the sensor 110 detecting (sensing) the task area in which the object is arranged. The processor 140 may obtain recognition information on the object by applying the image of the object captured by the camera 120 to the trained artificial intelligence model. The processor 140 may generate a semantic map including information indicating the environment of the task area by mapping the area of the object included in the navigation map with the recognition information of the object. The processor 140 may perform a task of the cleaning robot based on the control command of the user using the semantic map. Accordingly, the user provided with the semantic map may control the task of the cleaning robot 100 using the recognition information of the object in various methods, so that usability may be significantly improved.

The processor 140 may obtain recognition information of a place included in the task area using the recognition information of the object. The processor 140 may generate a semantic map including information indicating the environment of the task area using the recognition information of the place and the recognition information of the object included in the task area. Accordingly, it becomes possible for the user to control the tasks to be performed by the cleaning robot 100 with reference to either or both of the recognition information of each place and the recognition information of the object based on the provided semantic map.

The processor 140 may map the area of the object included in the navigation map with the recognition information of the object based on at least one of a location or a form of the object according to the detection result of the object to generate a semantic map indicating environment of the task area. Accordingly, the object may be mapped with an accurate location with respect to the navigation map to provide the semantic map.

The processor 140 may apply the image of the object captured by the camera 120 to the trained artificial intelligence model provided in the external server to obtain the recognition information of the object. By using the artificial intelligence model, the recognition rate of the object may be significantly increased. Particularly, by using the artificial intelligence model provided in the external server, the limitation on sources of the cleaning robot 100 may be overcome, and thus the usability of the artificial intelligence model may be improved using more resources.

The processor 140 may identify the boundary of the object corresponding to the object in the navigation map. The processor 140 may map the area of the object determined by the boundary of the object with the recognition information of the object to generate a semantic map indicting the environment of the task area.

The processor 140 may apply the image of the object captured by the camera 120 to the trained artificial intelligence provided in the external server and obtain the recognition information of the object.

The processor 140 may control at least one sensor selected based on the recognition information of the object, among a plurality of sensors included in the sensor 110, to detect (sense) the object. The processor 140 may obtain additional information on the object using the detection result by at least one sensor.

The processor 140 may set priorities with respect to a plurality of sensors according to the recognition information of the object. The processor 140 may obtain additional information on the object using the result detected by at least one sensor according to the priority, among the plurality of sensors.

The processor 140 may control the camera 120 to capture an object near the cleaning robot 100. The processor 140 may apply the captured image to the trained artificial intelligence model to obtain the recognition information of the object included in the image. The processor 140 may control at least one sensor selected based on the recognition information of the object, among the plurality of sensors included in the sensor 110, to detect the object. The processor 140 may obtain additional information on the object using the result detected by at least one sensor, and determine the task to be performed by the cleaning robot 100 with respect to the object based on the additional information on the object.

The processor 140 may set priorities with respect to the plurality of sensors included in the sensor 110 according to the recognition information on the object. The processor 140 may obtain additional information on the object by using the result detected by at least one sensor according to the priority.

The processor 140, when a priority is given higher to the IR stereo sensor, among the plurality of sensors, according to the recognition information on the object, may give a weighted value to the result detected by the IR stereo sensor and obtain the additional information on the object.

The processor 140 may identify a bounding box with respect to the recognized object, and reduce a threshold value of the IR stereo sensor with respect to an area in which the identification result of the bounding box does not coincide with the object detection result through the IR stereo sensor.

The processor 140, when the LIDAR sensor, among the plurality of sensors included in the sensor 110, is given higher priority according to the recognition information of the object, may give a weighted value to the result detected by the LIDAR sensor and obtain the additional information on the object.

The processor 140, when the ultrasonic sensor, among the plurality of sensors included in the sensor 110, is given a higher priority according to the recognition information of the object, may give a weighted value to the result detected by the ultrasonic sensor to obtain additional information on the object.

When a priority is set to be higher with respect to the ultrasonic sensor among the plurality of sensors included in the sensor 110 according to the recognition information of the object, the recognition object may be transparent or black.

The processor 140 may apply the captured image to the trained artificial intelligence model provided in the external server and obtain the recognition information of the object.

Figure 3:
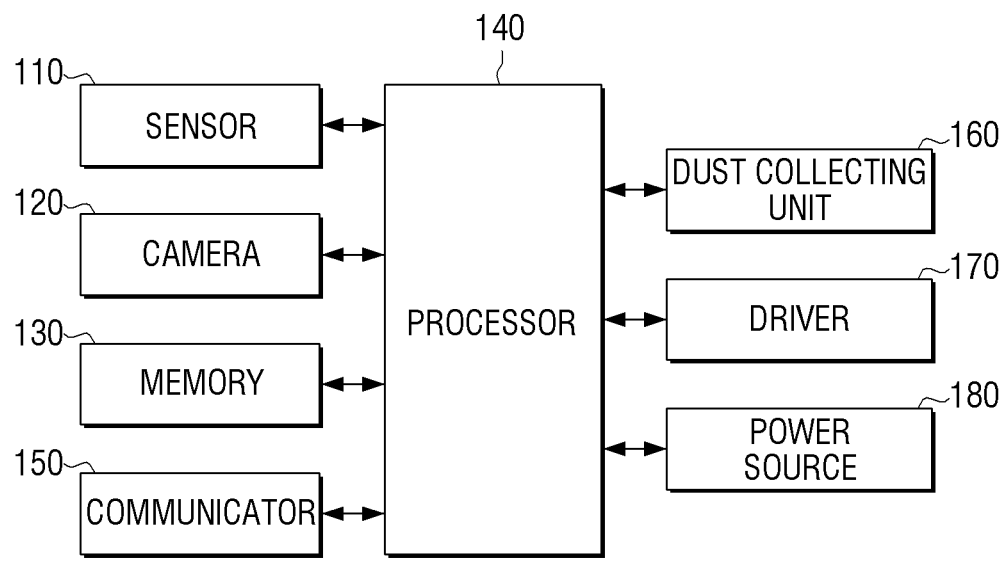
FIG. 3 is a detailed block diagram to explain a configuration of a cleaning robot according to an embodiment of the disclosure.

FIG. 3 is a detailed block diagram to explain a configuration of a cleaning robot according to an embodiment of the disclosure.

Referring to FIG. 3, a cleaning robot 100 may include a sensor 110, a camera 120, a memory 130, a communicator 150, a dust collecting unit 160, a driver 170, a power source 180, and a processor 140 electrically connected to the above-described constituent elements.

The sensor 110, the camera 120, the memory 130, and the processor 140 have been described, and thus the repeated description will be omitted.

The communicator 150 may transmit and/or receive data, control commands, etc. to and/or from an external device. For example, the communicator 150 may receive partial or entire map information including location information on the space in which the cleaning robot 100 operates from the external device. The communicator 150 may transmit information for renewing the entire map information to the external device. For another example, the communicator 150 may receive a signal for controlling the cleaning robot 100, which is transmitted by a user using a remote control device. The remote control device may be embodied in various forms such as a remote controller, a mobile device, etc.

The communicator 150 may transmit and/or receive data to and/or from an external server (not shown). For example, when an artificial intelligence model is stored in the external server, the communicator 150 may transmit the image captured by the camera 120 to the external server, and receive the recognition information on the object (e.g., information on the obstacles) recognized by using the artificial intelligence model stored in the external server. However, the disclosure is not limited thereto, but the communicator 150 may receive information on the movable area for the space in which the cleaning robot 100 performs a task from the external server.

The communicator 150 may include a communication interface that uses various methods such as Near Field Communication (NFC), Wireless local-area network (LAN), InfraRed (IR) communication, Zigbee communication, WiFi, Bluetooth, etc. as a wireless communication method.

The dust collecting unit 160 may be configured to collect dust. Specifically, the dust collecting unit 160 may inhale air, and collect dust in the inhaled air. For example, the dust collecting unit 160 may include a motor for passing air through a guide pipe from an inlet to an outlet, a filter for filtering dust in the inhaled air, and a dust basket for collecting the filtered dust.

The driver 170 may be configured to drive movement of the cleaning robot 100. For example, the driver 170 may move the cleaning robot 100 to the position to perform task under the control of the processor 140. In this case, the driver 170 may include at least one wheel contacting the bottom, a motor for providing a driving force to the wheel, and a driver for controlling the motor. For another example, the driver 170 may operate to perform a task. In the case of object moving task, the driver 170 may include a motor for performing an operation such as picking up an object.

The power source 180 may supply power required for driving the cleaning robot 100. For example, the power source 180 may be embodied as a battery that can be charged or discharged. The processor 140 may control the driver 110 to be moved to a charging station when a remaining power level is equal to or smaller than a predetermined level, or the task is completed. The power source 180 may be charged using at least one of a contact method, or a non-contact method.

FIG. 4A, FIG. 4B, FIG. 4C, and FIG. 4D are views to explain how a cleaning robot may obtain additional information on an object based on a detection result through an IR stereo sensor according to an embodiment of the disclosure.

The cleaning robot 100 may detect an object in front of itself through the IR stereo sensor. The cleaning robot 100 may recognize an object on the bottom in front of itself through the camera 120. The cleaning robot 100 may detect the object through the IR stereo sensor, and obtain length, height and/or depth information on the object. For example, referring to FIG. 4A, the cleaning robot 100 may recognize and detect a plurality of objects 410 and 420 in front of itself through the camera 120 and the IR stereo sensor, and obtain the length, height or depth information on the objects 410 and 420, which may be a flowerpot 410 and a carpet 420.

Figure 4A:
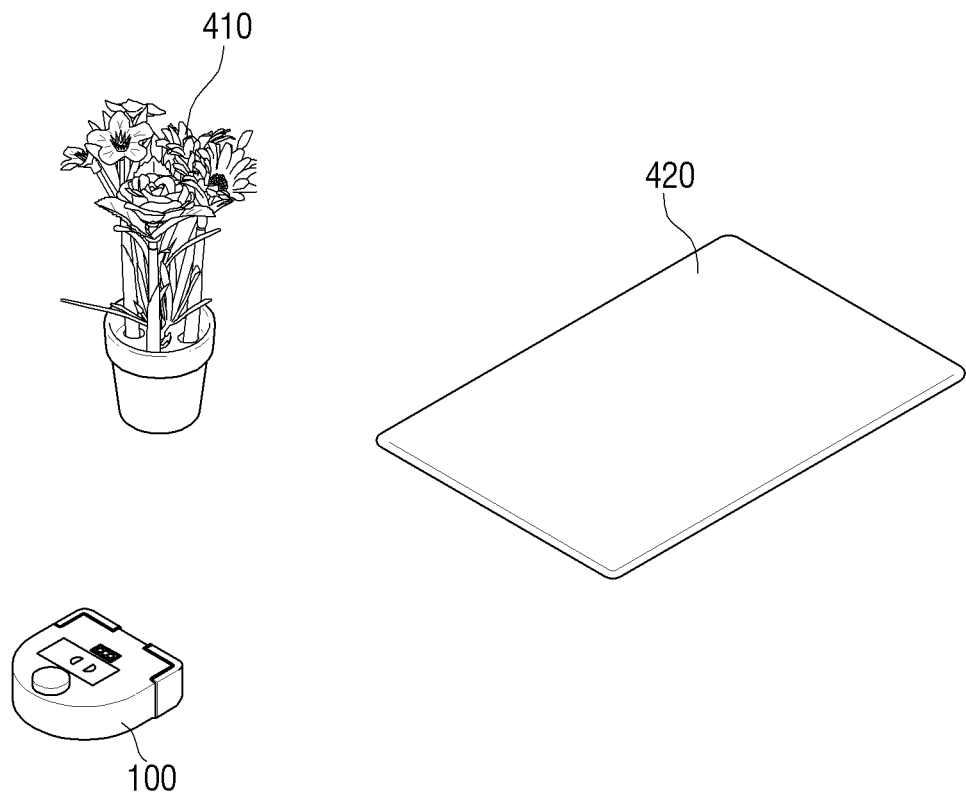
FIG. 4A, FIG. 4B, FIG. 4C, and FIG. 4D are views to explain that a cleaning robot obtains additional information on an object based on a detection result through an InfraRed (IR) stereo sensor according to an embodiment of the disclosure.
Figure 4B:
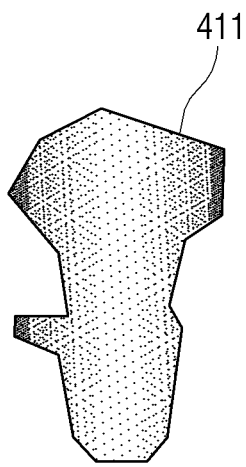

The IR stereo sensor may detect an object when the one of the length, height or depth of the object is greater than a threshold value, but may not detect an object when the one of the length, height or width depth of the object is smaller than a threshold value. For example, when the height information of the carpet 420 is smaller than a predetermined threshold value, the cleaning robot 100 may not detect the carpet 420. Referring to FIG. 4B, the cleaning robot 100 may obtain depth information 411 on a flowerpot 410 through the IR stereo sensor.

The camera 120 may detect and recognize the objects 410 and 420 in front of itself regardless of the height or depth information on the object. The cleaning robot 100, referring to FIG. 4C, may capture and recognize images of the flowerpot 410 and the carpet 420, respectively, and determine bounding boxes 412 and 422 with respect to the respective objects 410 and 420.

Figure 4C:
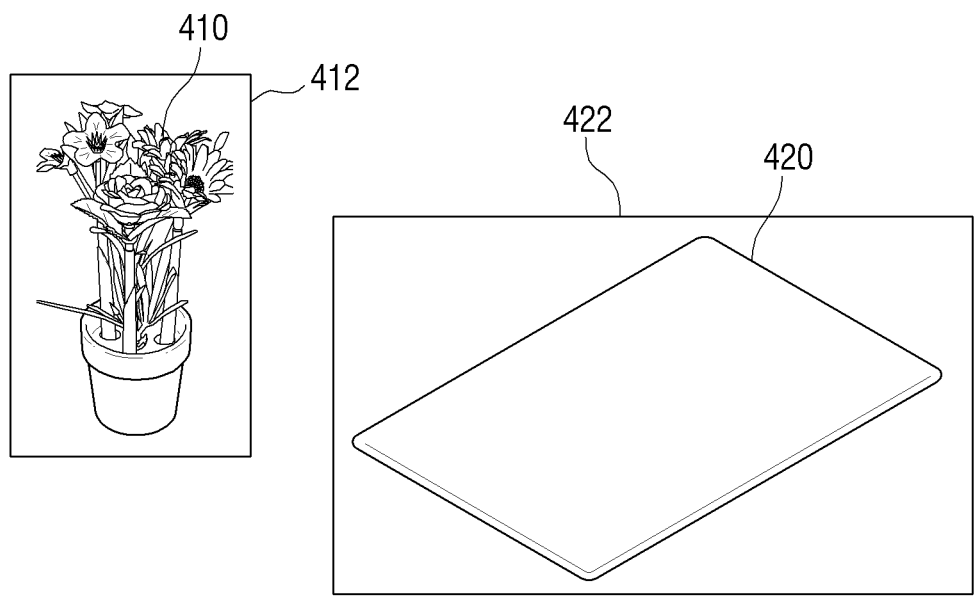
Figure 4D:
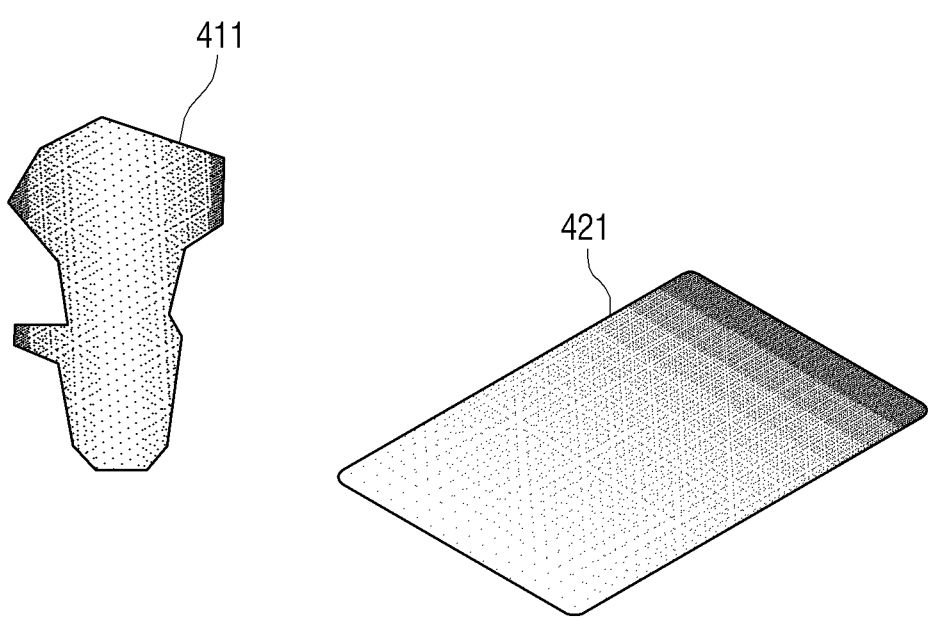

Referring to FIG. 4B and FIG. 4C, the cleaning robot 100, when the recognition result of the object through the camera 120 is different from the detection result of the object through the IR stereo sensor, may set a threshold value of the IR stereo sensor to be small. The cleaning robot 100 may reduce a threshold value of the IR stereo sensor until the object recognition result through the camera 120 coincides with the object detection result through the IR stereo sensor, for example, until the number of objects is the same. When the threshold value of the IR stereo sensor is significantly lowered, the cleaning robot 100, referring to FIG. 4D, may obtain not only the depth information 411 on the flowerpot 410, but also size information (such as depth information) 421 on the specific object (such as carpet 420) as additional information through the IR stereo sensor.

Referring to FIG. 4C, the cleaning robot 100 may reduce a threshold value of the IR stereo sensor with respect to the areas corresponding to the obtained bounding boxes 412 and 422. The cleaning robot 100 may compare the object recognition result with the object detection result through the IR stereo sensor and reduce the threshold value of the IR stereo sensor with respect to a different area 422. According to the above-described embodiment, the cleaning robot 100 may not only detect the carpet 420 that is not detected by the IR stereo sensor, but also maintain an existing threshold value in detecting a new object.

Figure 5B:
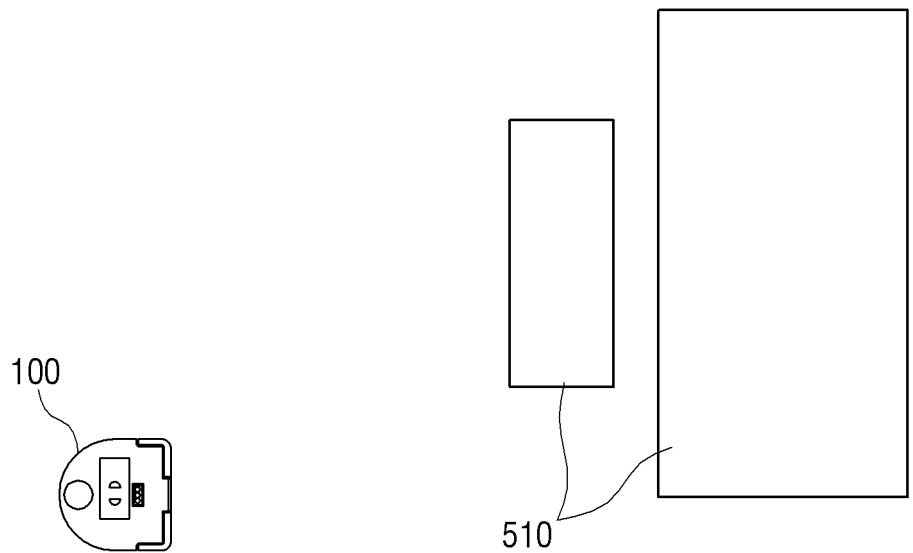
Figure 5C:
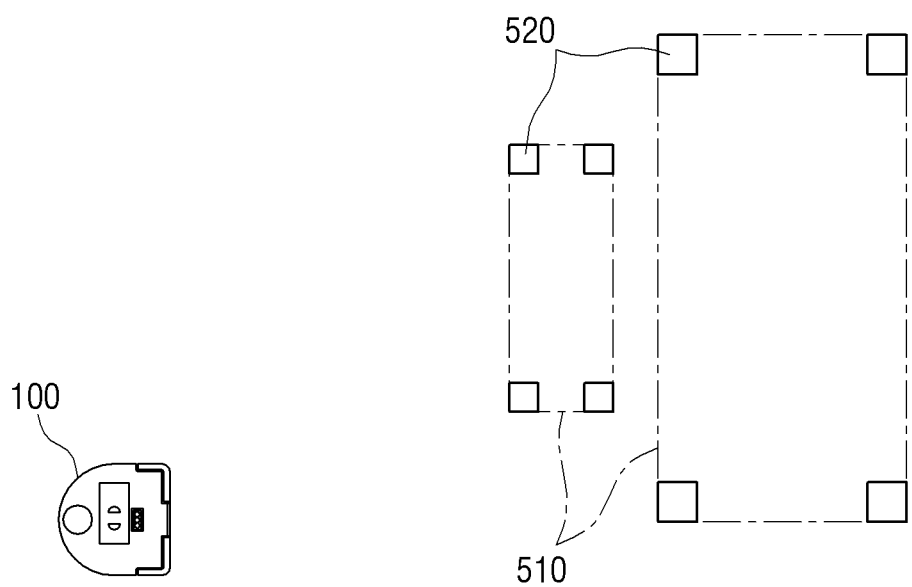

FIG. 5A, FIG. 5B, and FIG. 5C are views to explain how a cleaning robot may obtain additional information on an object based on a detection result through a LIDAR sensor.

Referring to FIG. 5A, the cleaning robot 100 may capture and recognize the object 500 near the cleaning robot 100 through the camera 120. As a result of recognizing an object, the cleaning robot 100 may determine that the recognized object 500 is a specific type of object, such as, a desk or a chair. When the object is a desk or a chair, the cleaning robot 100 may detect an object by prioritizing the LIDAR sensor to other sensors as an additional sensor for obtaining additional information on the object.

FIG. 5B is a plane view illustrating that the cleaning robot 100 recognizes the object 500, and determines the bounding box 510 with respect to the object 500. As described above, the cleaning robot 100 may obtain detailed information of the object 500 as additional information through the LIDAR sensor which is given a higher priority than another sensor. To be specific, the LIDAR sensor may obtain information on the bridge of the object 500 as the cleaning robot 100 ejects the laser pulse in the direction of the object recognized by the cleaning robot 100.

Referring to FIG. 5C, the cleaning robot 100 may obtain information 520 on parts of the object 500 (e.g., the legs of the object 500) through the LIDAR sensor. In other words, the cleaning robot 100 may obtain information on the positions of the legs and the spaces between the positions of the legs of the object 500 and determine an appropriate task.

Figure 6A:
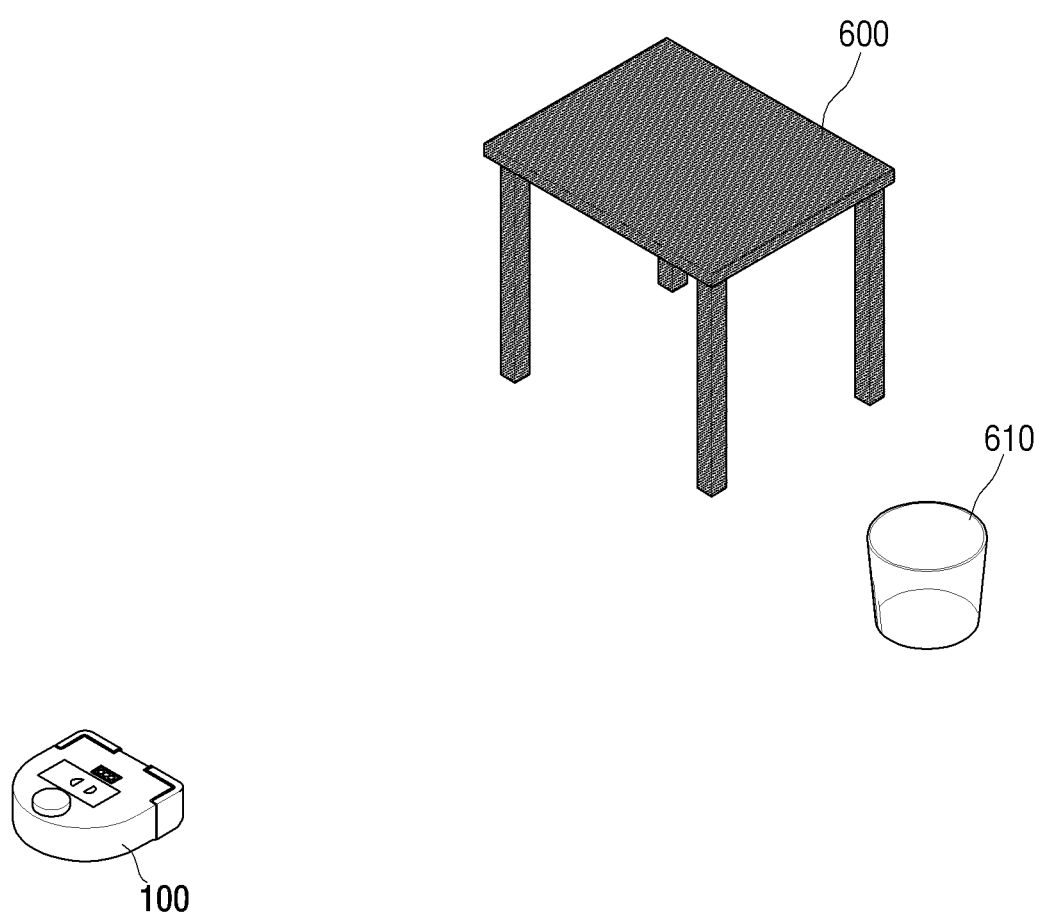
FIG. 6A and FIG. 6B are views to explain that a cleaning robot obtains additional information on an object based on a detection result through an ultrasonic sensor.
Figure 6B:
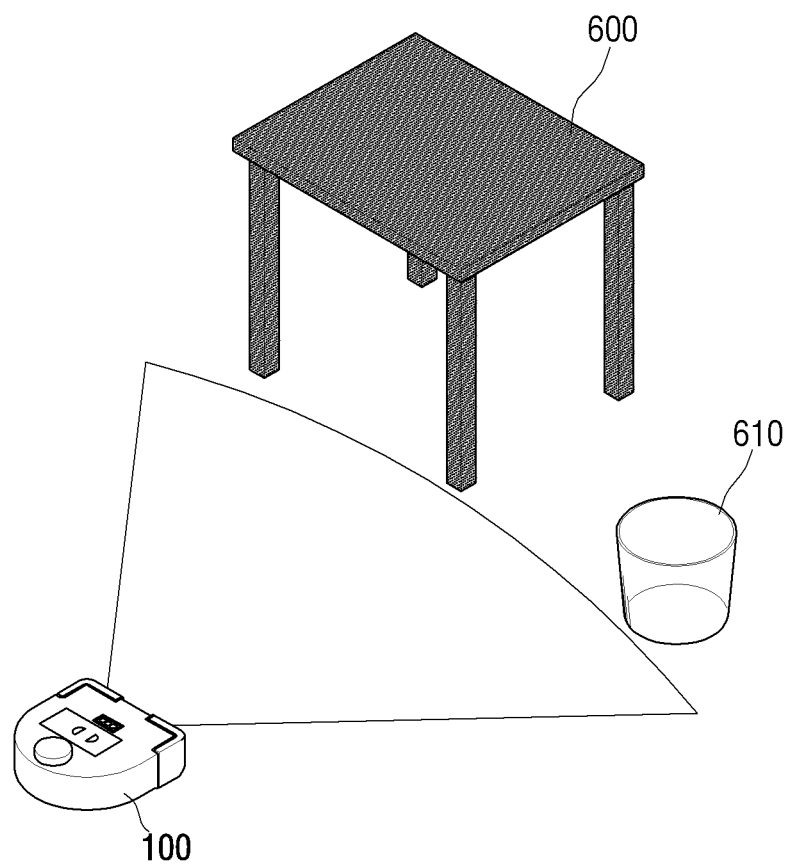

FIG. 6A and FIG. 6B are views to explain that a cleaning robot obtains additional information on an object based on a detection result object through an ultrasonic sensor.

Referring to FIG. 6A, when an object is a black table 600, or a transparent glass cup 610, the IR stereo sensor or the LIDAR sensor may not detect the object. When recognizing the object as the black table 600 and the glass-cup 610 in the image obtained through the camera 120, the cleaning robot 100 may detect the object by giving a higher priority to the ultrasonic sensor rather than the IR stereo sensor or the LIDAR sensor.

The cleaning robot 100 may rotate to the right or to the left and try to detect an object because the ultrasonic sensor has a limited detection range. For example, referring to FIG. 6B, the cleaning robot 100 may obtain additional information on the object such as the locations of legs of a black table 600, and/or the location of a glass-cup 610 through ultrasonic wave by accessing within a distance that can be detected by the ultrasonic sensor.

The cleaning robot according to an embodiment may have an advantage of detecting an object that is difficult to detect through the IR stereo sensor and the LIDAR sensor.

Figure 7A:
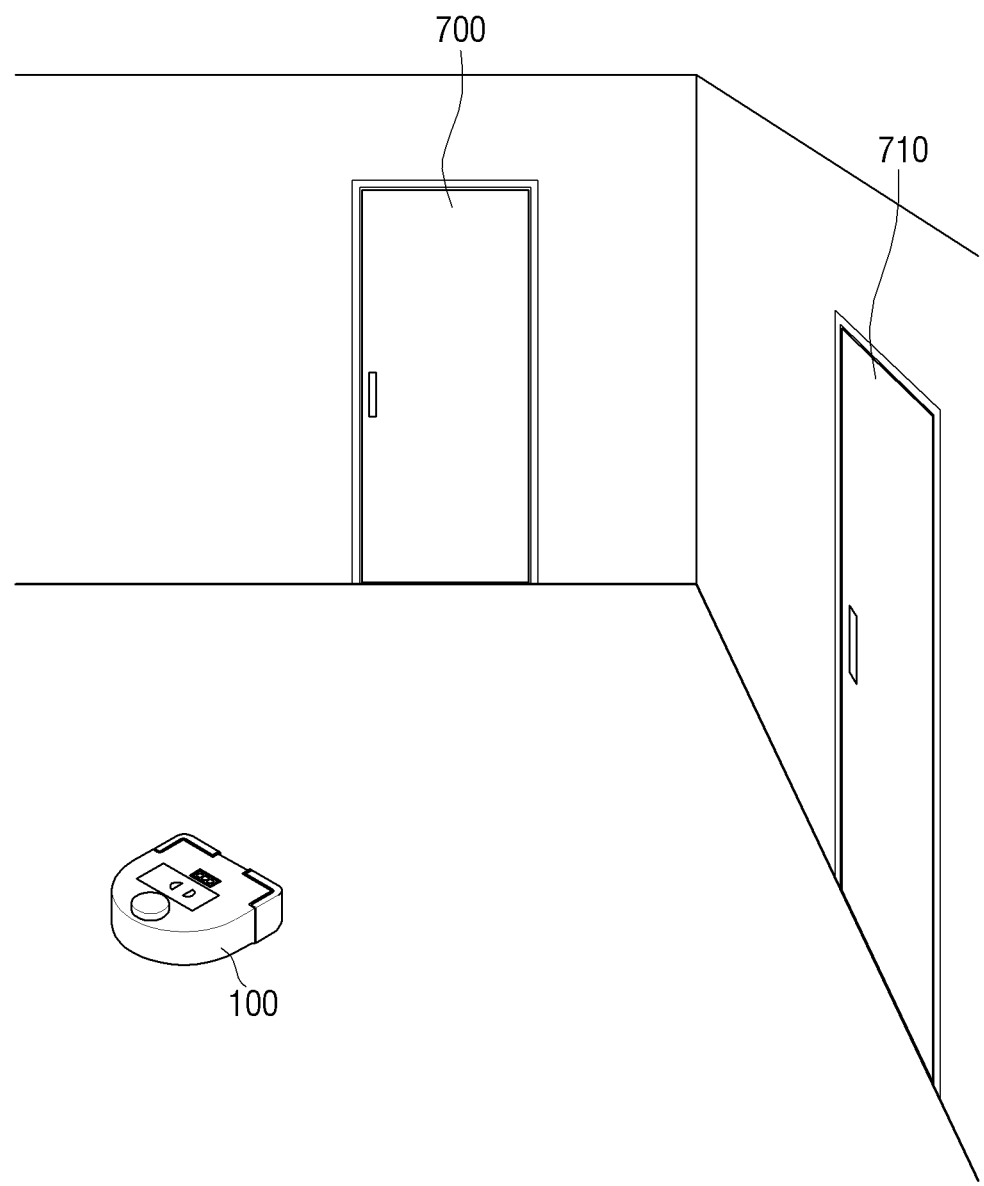
FIG. 7A, FIG. 7B and FIG. 7C are views illustrating that a cleaning robot recognizes the structure of house.
Figure 7B:
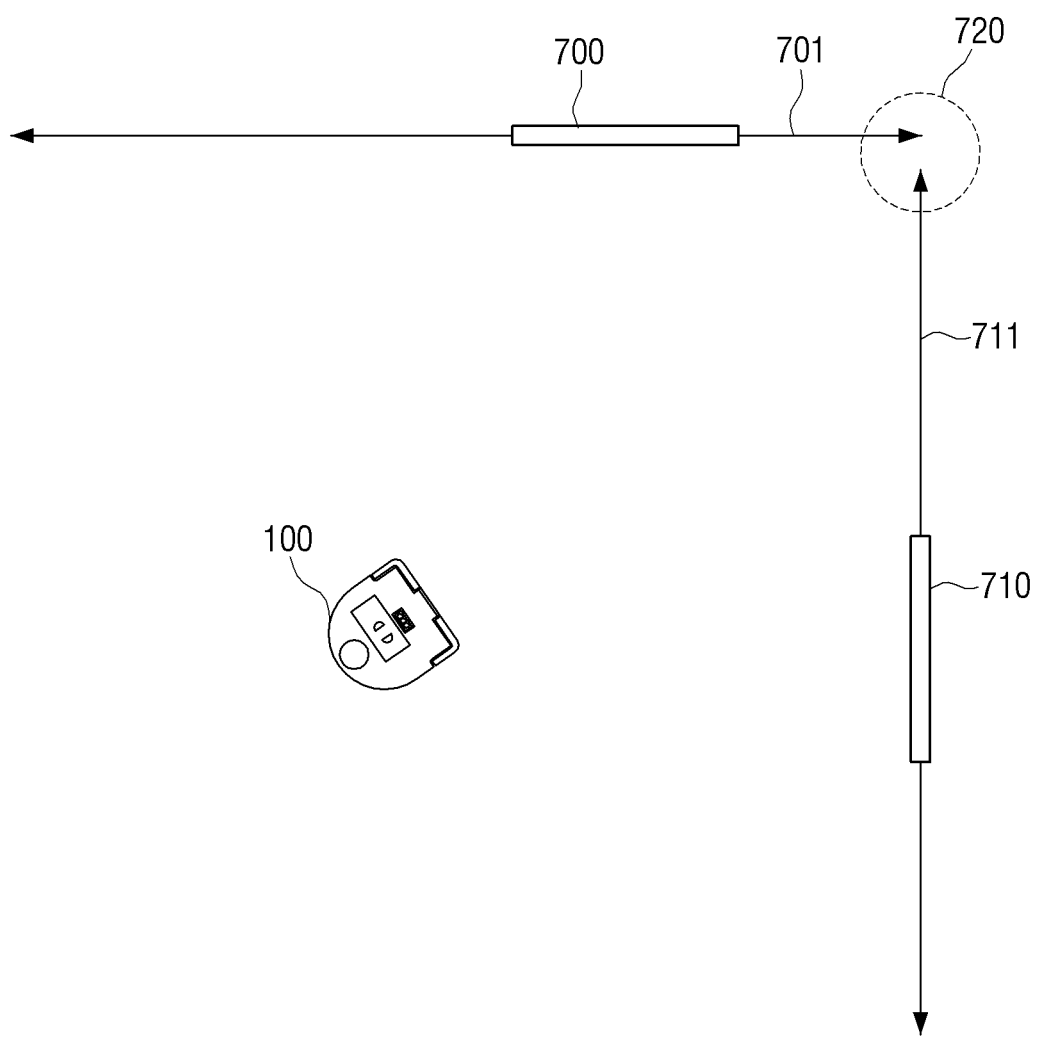

FIG. 7A, and FIG. 7B are views illustrating that a cleaning robot recognizes the structure of a house.

Referring to FIG. 7A, the cleaning robot 100 may recognize objects 700 and 710, which may be doors, using a result of detecting the objects by using the camera 120 or at least one of a plurality of sensors. The cleaning robot 100 may recognize the object as a door based on the result of inputting the image including the doors 700 and 710 to the artificial intelligence model.

When the detected object is a door, the cleaning robot 100 may determine the structure of the task area (e.g., the structure of house) through the door. For example, the cleaning robot 100 may determine both sides in a direction horizontal to the doors 700 and 710 as walls unless there are exceptional cases.

Referring to FIG. 7B, the cleaning robot 100 may determine both directions horizontal to a recognized first door 700 as a first wall 701, and the both directions horizontal to a recognized second door 710 as a second wall 711. The cleaning robot may determine a portion 720 in which the first wall 701 crosses the second wall 711 as the edge or corner of the one or more walls of the house.

Figure 7C:
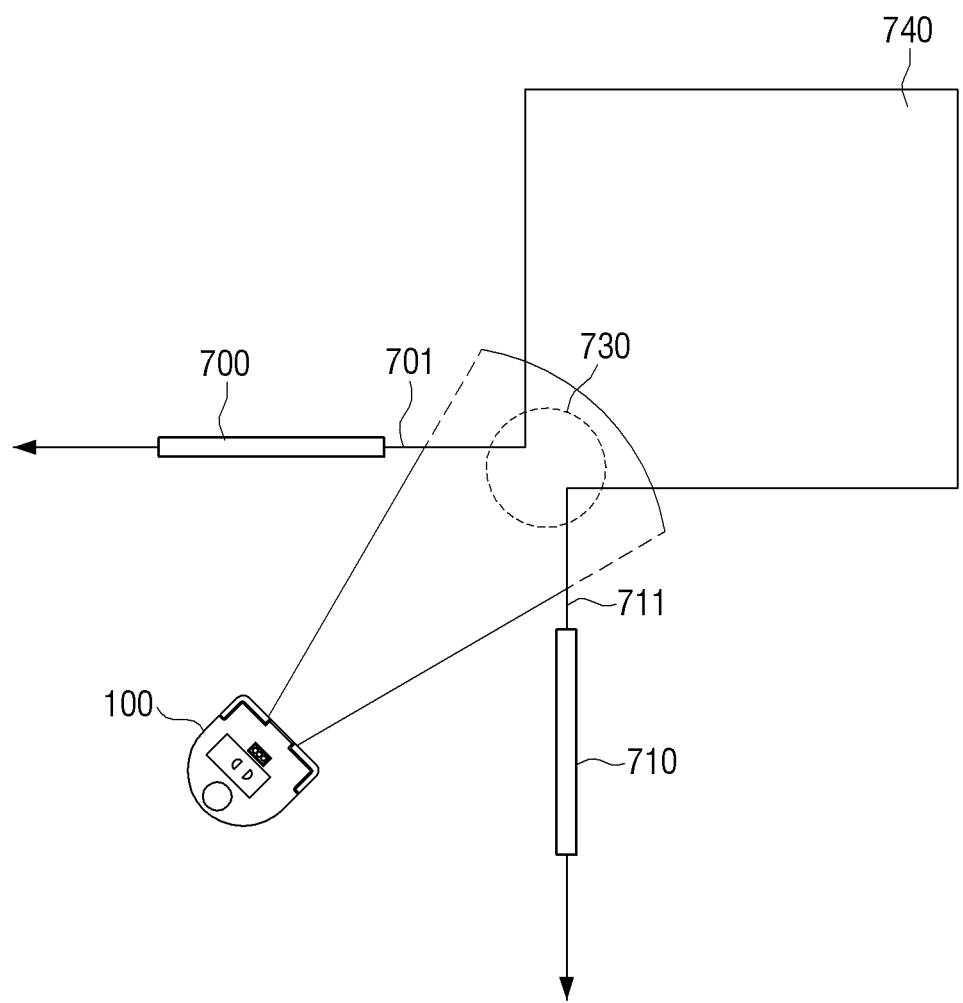

Referring to FIG. 7C, the cleaning robot 100 may detect an empty space of a portion 730 in which the first wall 701 and the second wall 711 are expected to cross each other.

For example, when there is an additional area 740 in the portion in which the two walls are expected to cross each other, the cleaning robot 100 may detect the additional area 740 using the LIDAR sensor. According to the result of detection, the cleaning robot 100 may determine there is a space between the first wall 701 and the second wall 711, and include the additional area 740 in the portion of the structure of the task area.

The cleaning robot 100 according to an embodiment, when recognizing an object as a door, may not only recognize the object, but also recognize the structure of the task area. In addition, the cleaning robot 100 according to an embodiment may generate a semantic map reflecting the structure of the task area into the navigation map.

Figure 8A:
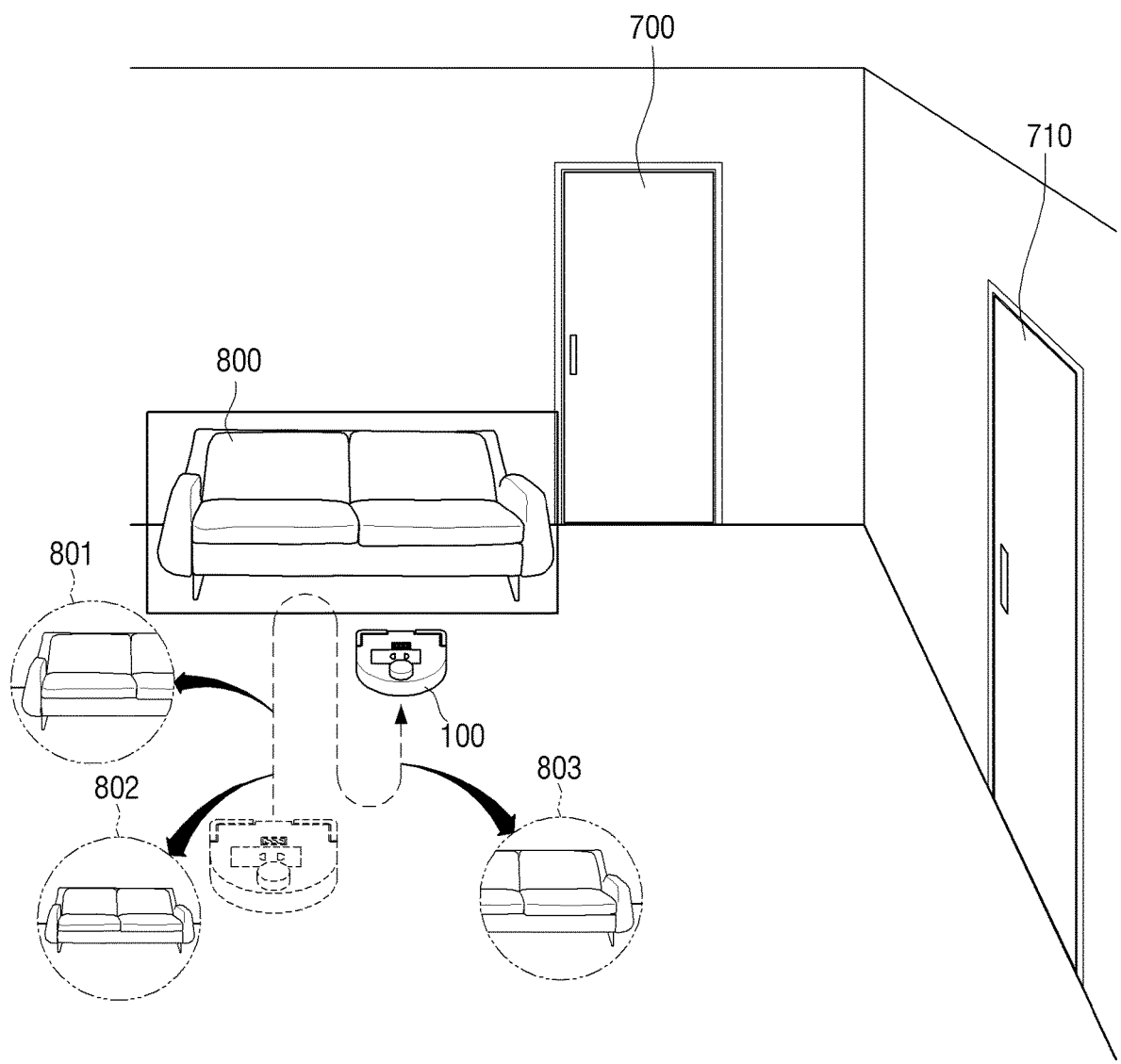
FIGS. 8A and 8B are views to explain that a cleaning robot generates a semantic map based on the structure of a house and additional information on an object according to an embodiment of the disclosure.
Figure 8B:
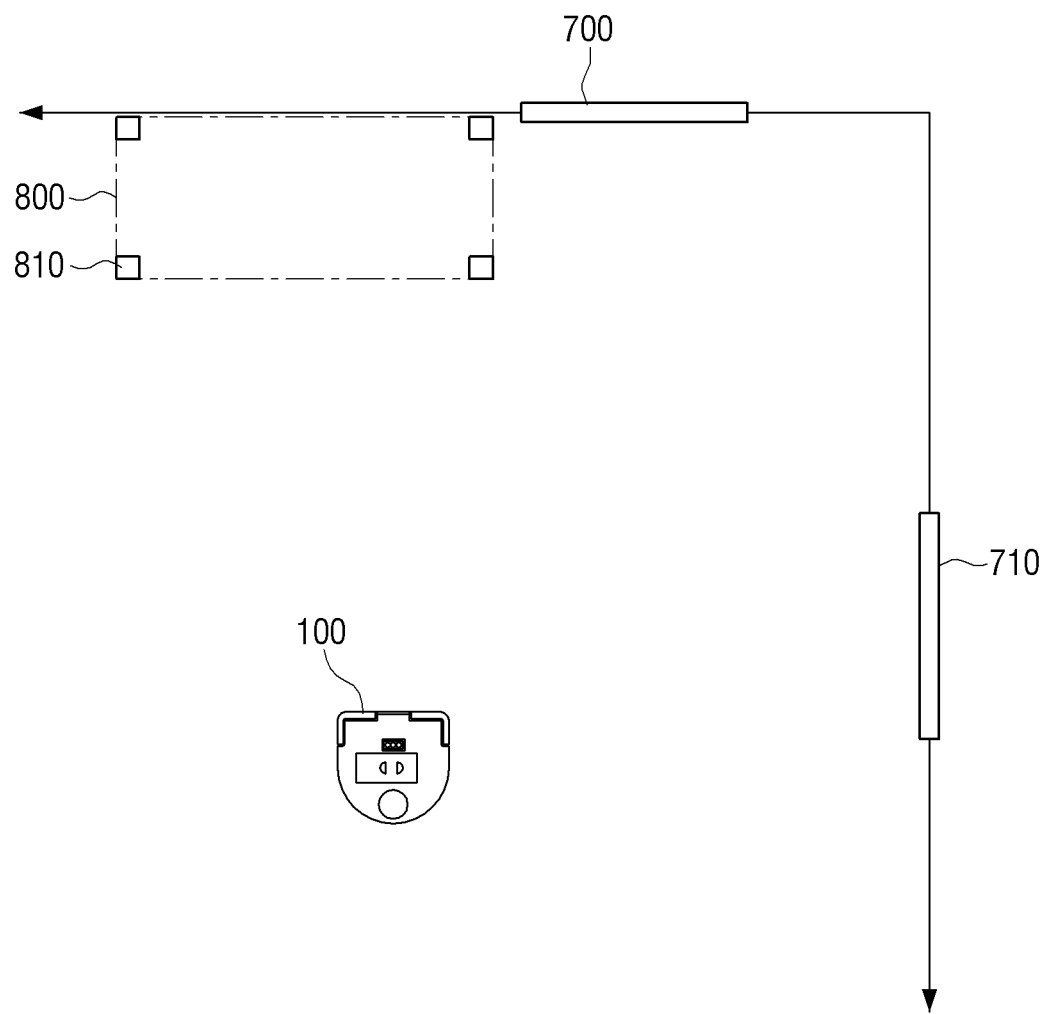

FIGS. 8A and 8B are views to explain that a cleaning robot generates a semantic map based on the structure of house and additional information on an object according to an embodiment of the disclosure.

Referring to FIG. 8A, the cleaning robot 100 may recognize objects in a house as doors 700 and 710, and a sofa 800.

As explained in FIG. 7A and FIG. 7B, the cleaning robot 100 may recognize the structure (e.g., walls in the house) of the task area through the doors 700 and 710. The cleaning robot 100 may recognize the sofa 800 driving toward the object. For example, referring to FIG. 8A, the cleaning robot 100 may obtain a plurality of images 801 to 803 of the object based on the result of detection by the camera 120 or at least one of the plurality of sensors while driving toward the object. For example, the cleaning robot 100 may capture the object at every predetermined distance interval (e.g., 20 cm to 40 cm) or temporal interval period (e.g., 0.5 sec to 2 sec) and obtain the images 801 to 803 to store the images in the memory 130.

When the cleaning robot 100 returns to the charging station when completing the task, or for charging, the cleaning robot 100 may obtain recognition information of the object from the images 801 to 803 stored in the memory 130. The cleaning robot 100 may apply the stored images 801 to 803 to the artificial intelligence model to obtain the recognition information on the object.

The cleaning robot 100, when the additionally recognized object is a specific type of object (e.g., the sofa 800), which is not an obstacle or foreign substance, may add this information to a navigation map with respect to the task area and generate a semantic map.

For example, referring to FIG. 8B, the cleaning robot 100 may generate a semantic map based on sofa leg information 810 additionally obtained through the LIDAR sensor with respect to the sofa 800, which is the structure, and the structure of the task area inferred through the doors 700 and 710.

Figure 9A:
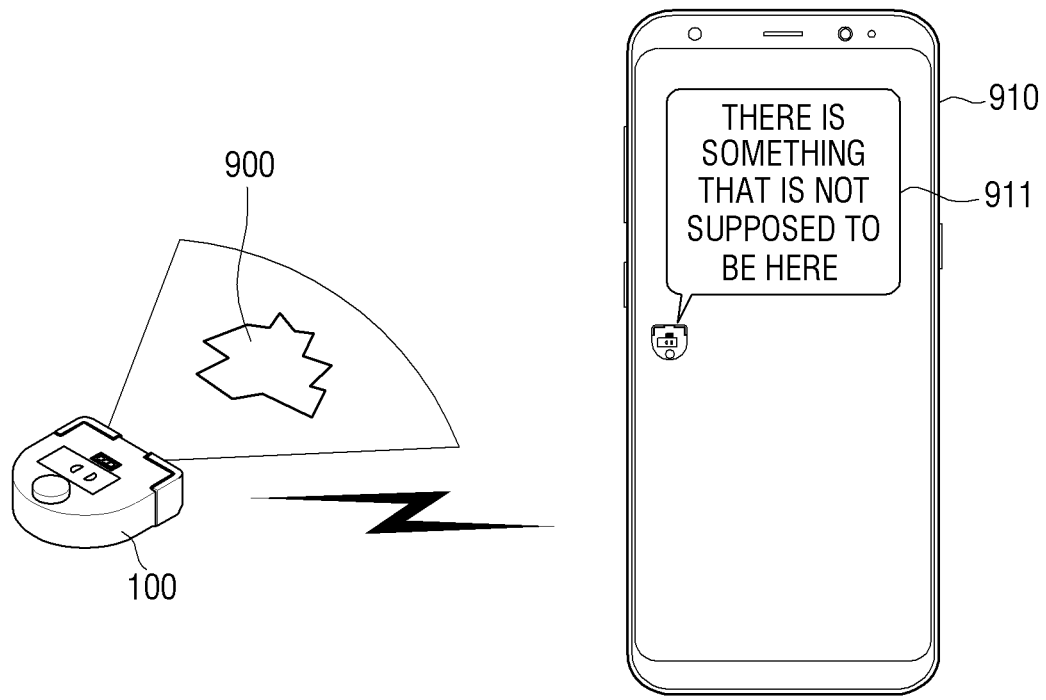
FIG. 9A and FIG. 9B are views to explain that a cleaning robot informs a user of a dangerous material on the floor.
Figure 9B:
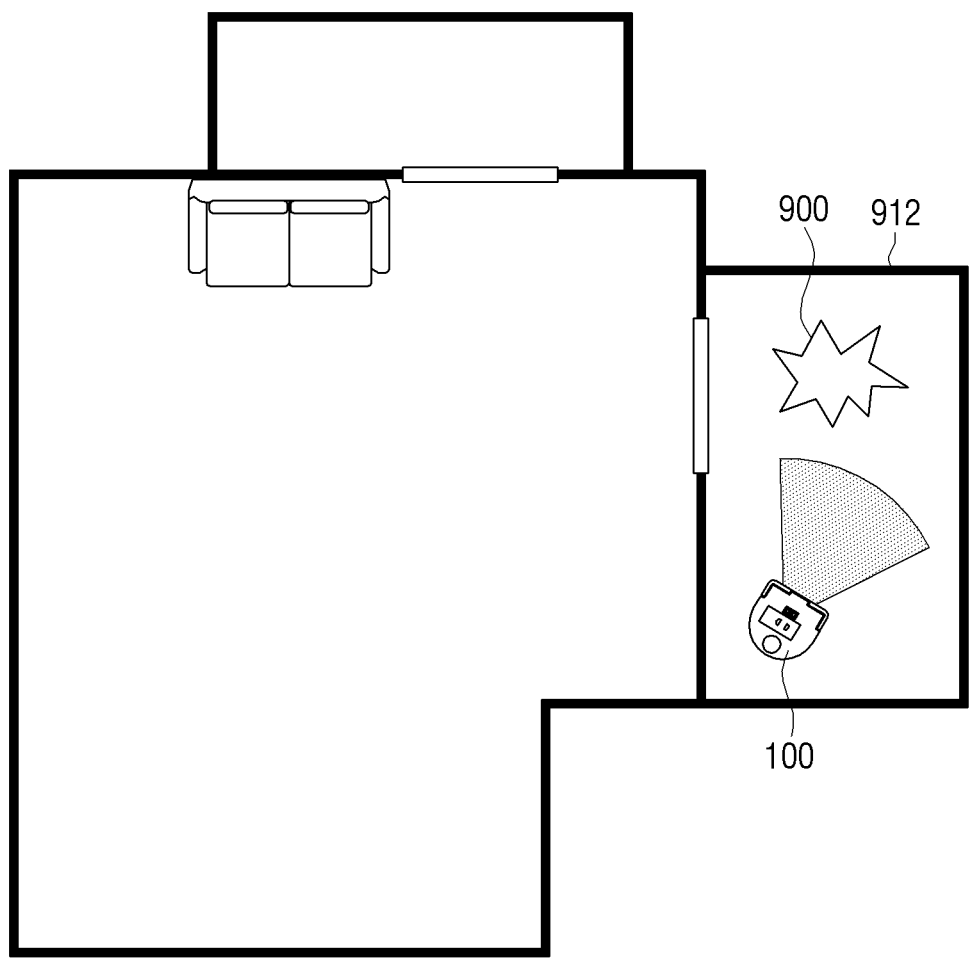

FIG. 9A and FIG. 9B are views to explain that a cleaning robot informs a user of a dangerous material on the floor.

Referring to FIG. 9A, the cleaning robot 100 may recognize the object on the floor as a broken glass cup 900. The cleaning robot 100 may input an image including the object 900 into the artificial intelligence model, and preform object recognition to recognize the object as a broken glass cup.

The cleaning robot 100 may inform a user that a dangerous object is on the floor. The cleaning robot 100 may transmit alarming data to the user terminal device 90 so that an alarming statement 911, for example, 'the thing that is not supposed to be here is on the floor', or 'there is something that is not supposed to be here' may be shown on the user terminal device 910. In addition, the cleaning robot 100 may transmit alarming data to the user terminal device 910 so that the alarming statement including the recognition information of the object as alarming data. For example, when the object is recognized as a glass cup, the cleaning robot 100 may transmit alarming data to the user terminal device 910 so that the alarming statement (e.g., 'a glass cup is on the floor') may be displayed.

The cleaning robot 100 may transmit the navigation map or the semantic map generated according to the methods shown in FIG. 7A to FIG. 8B to the user terminal device 910. The user terminal device 910 may display the semantic map or the navigation map on the user terminal device 910, and display location information of the dangerous object received from the cleaning robot 100.

For example, referring to FIG. 9B, the user terminal device 910 may display a user interface (UI) 912 with respect to the navigation map received from the cleaning robot 100, and display the location of the dangerous object 900 detected by the cleaning robot 100 on the UI.

Therefore, a user may easily recognize whether a dangerous object drops onto the floor, or whether there is a dangerous object.

Figure 10:
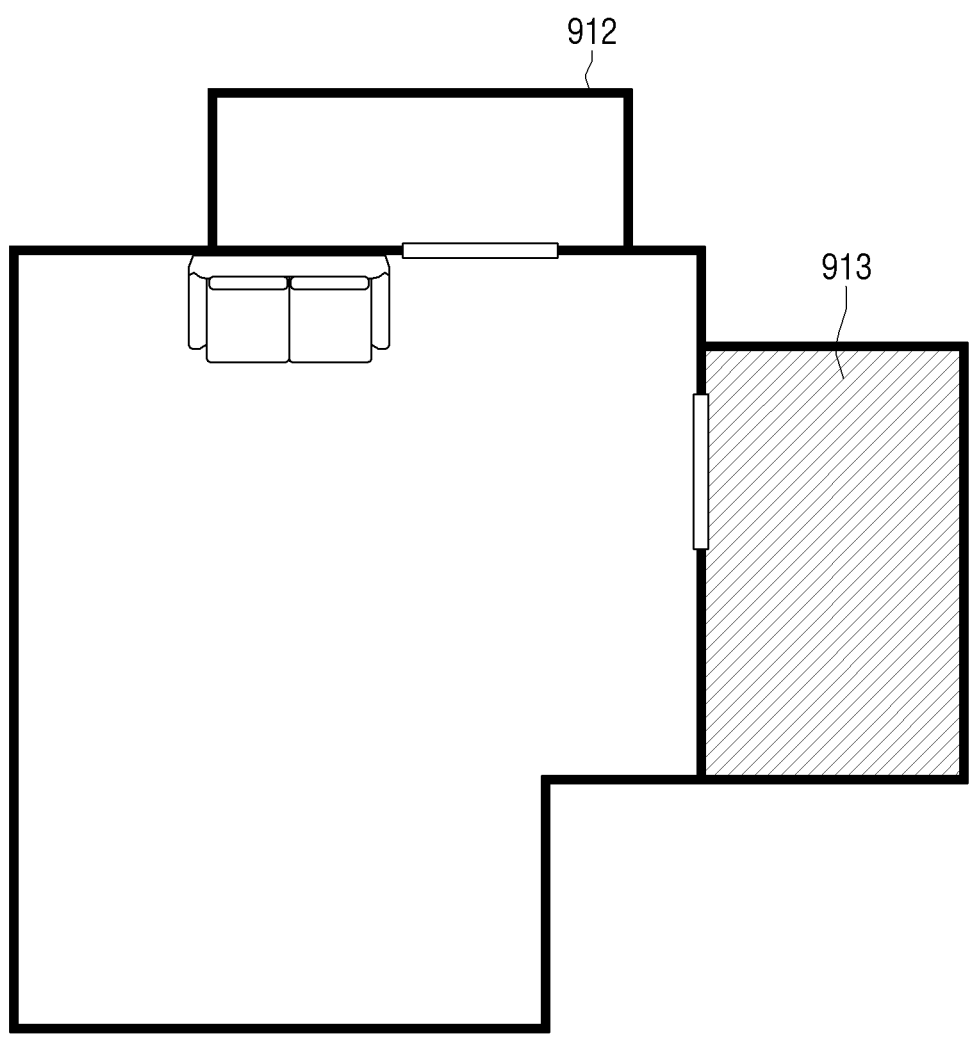
FIG. 10 is a view to explain that a cleaning robot designates an area not to be cleaned according to an embodiment of the disclosure.

FIG. 10 is a view to explain that a cleaning robot designates an area not to be cleaned according to an embodiment of the disclosure.

The user terminal device 910 may receive the navigation map from the cleaning robot 100, and display the UI 912 thereof.

The user may designate an area 913 not to be cleaned by the cleaning robot 100. For example, when it is necessary to limit access to a specific area 930 on the navigation map (e.g., when a baby sleeps), the user may instruct the cleaning robot 100 not to clean the specific area 930 through interaction for the specific area 913 (e.g., touch, click, etc.) displayed on the user terminal device 910. For example, the touch may occur as a user input on a touch screen display device.

The cleaning robot 100 may perform a task of automatically avoiding the access limited specific area 913 without receiving a user's command(s). For example, before accessing the specific area 913, the cleaning robot 100 may recognize an object included in the specific area 913 (e.g., a sleeping baby) using the artificial intelligence model. As a result of recognizing the specific object (e.g., sleeping baby), if it is determined that access limitation is required for the specific area 913, the cleaning robot 100 may perform a task while driving and avoiding the specific area 913.

Figure 11A:
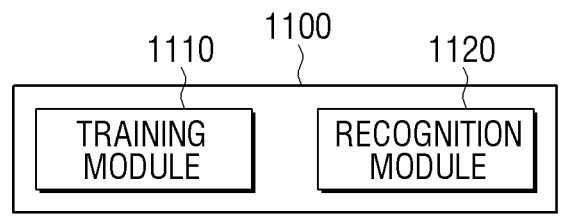
FIG. 11A and FIG. 11B are block diagrams illustrating a training module and a recognition module according to various embodiments of the disclosure.
Figure 11B:
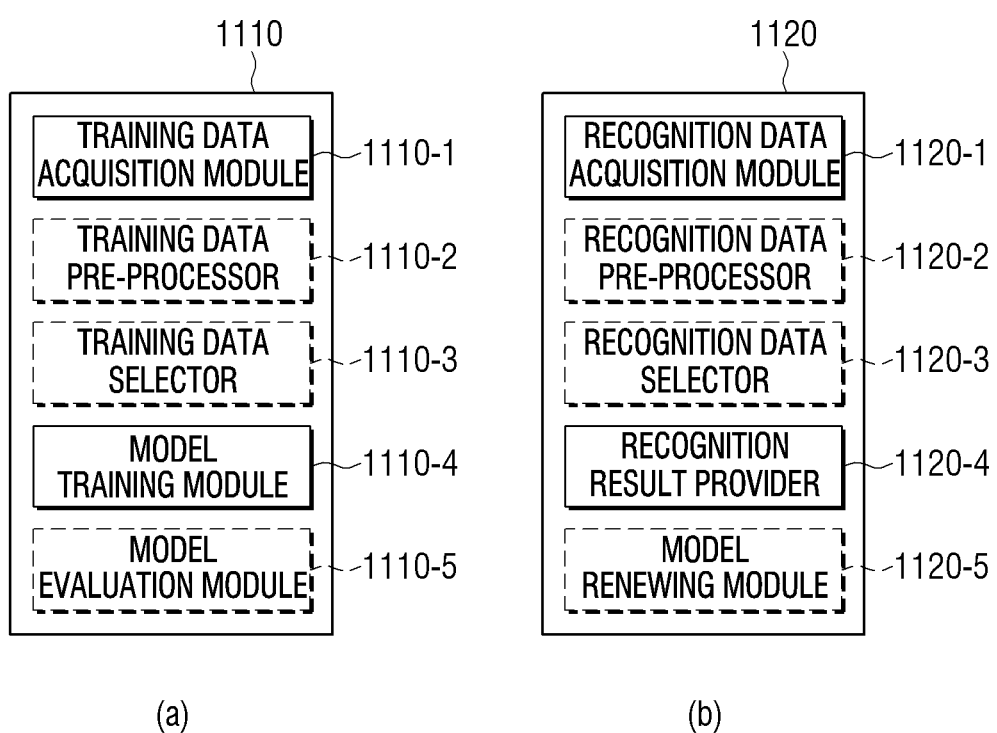

FIG. 11A and FIG. 11B are block diagrams illustrating a training module and a recognition module according to various embodiments of the disclosure.

Referring to FIG. 11A, a processor 1100 may include at least one of a training module 1110 and a recognition module 1120. The processor 1100 of FIG. 11A may correspond to the processor 140 of the cleaning robot 100, or correspond to a processor of an external server (not shown) that can communicate with the cleaning robot 100.

The training module 1110 may generate and train a recognition model having predetermined criteria for determining a situation. The training module 1110 may generate a recognition model having determination criteria using the collected training data.

The training module 1110 may generate, train, or renew an object recognition model having criteria for determining which object is included in the image by using the image including the object as training data.

The training module 1110 may generate, train, or renew a peripheral information recognition model having criteria for determining various additional information near the object included in the image by using peripheral information included in the screen including the object as training data.

The training module 1110 may generate, train, or renew an obstacle recognition model having criteria for determining obstacles included in the image by using the image captured by the camera as training data.

The recognition module 1120 may use predetermined data as input data of the trained recognition model, and assume an object to be recognized in the predetermined data.

For example, the recognition module 120 may obtain (or assume, infer, etc.) object information on an object included in an object area by using the object area (or image) including the object as input data of the trained recognition model.

For another example, the recognition module 1120 may apply the object information to the trained recognition model to assume (or determine, infer, etc.) a search category to provide a search result. The search result may include a plurality of search results according to the priority.

At least part of the training module 1110 or the recognition module 1120 may be embodied with a software module, or in the form of at least one hardware chip to be mounted on an electronic apparatus. For example, at least one of the training module 1110 and the recognition module 1120 may be manufactured in the form of a hardware chip for Artificial Intelligence (AI) only, or manufactured as a part of an existing general purposed processor (e.g. a CPU or an application processor) or a part of a graphic purposed processor (e.g., a GPU) to be mounted on the cleaning robot 100. The hardware chip for Artificial Intelligence (AI) only may be a processor dedicated to probability computation having a higher parallel processing performance than the conventional general-purpose processor, thereby quickly performing an arithmetic operation in the artificial intelligence field such as machine training. When the training module 1110 or the recognition module 1120 are implemented as a software module (or a program module including an instruction), the software module may be a non-transitory computer readable media that is computer-readable. In this case, the software module may be provided by an operating system (OS) or provided by a predetermined application. Alternatively, some of the software modules may be provided by an Operating System (OS), and others of the software modules may be provided by a predetermined application.

The training module 1110 and the recognition module 1120 may be mounted on one electronic apparatus, or mounted on each of the electronic apparatuses. For example, one of the training module 1210 and the recognition module 1320 may be included in the cleaning robot 100, and the other one may be included in the external server. In addition, the training module 1110 and the recognition module 1120 may be connected in a wired/wireless manner, to provide the model information established by the training module 1110 to the recognition module 1120, and the data input to the recognition module 1120 may be provided to the training module 1110 as additional training data.

FIG. 11B is a block diagram to explain a training module 1110 and a recognition module 1120 according to various embodiments of the disclosure.

Referring to part (a) of FIG. 11B, the training module 1110 according to an embodiment may include a data acquisition part 1110-1 and a model training module 1110-4. The training module 1110 may selectively include at least one of the training data pre-processor 1110-2, the training data selector 1110-3, or the model evaluation module 1110-5.

The training data acquisition unit 1110-1 may obtain training data necessary for the recognition model for inferring an object to be recognized. The training data acquisition unit 1110-1 may obtain an entire image including the object, an image corresponding to the object area, and object information as training data. The training data may be data collected or tested by the training module 1110 or the manufacturer of the training module 1110.

The model training module 1110-4 may train a recognition model to have predetermined criteria for determining how to determine an object to be recognized using training data. For example, the model training module 1110-4 may train a recognition model through supervised learning using at least part of training data as determination criteria. The model training module 1110-4, for example, may train itself by using training data without additional supervised learning, and train a recognition model through unsupervised learning for finding determination criteria for determining a situation.

In addition, the model training module 1110-4, for example, may train a recognition model through reinforcement learning using feedback on whether the result of determining the situation according to the training is appropriate. The model training module 1110-4, for example, may train a recognition model using a training algorithm including an error back-propagation method or a gradient descent method.

The model training module 1110-4 may train determination criteria on which training data is to be used for predicting an object to be recognized using input data.

The model training module 1110-4, when there is the established recognition models are in plural, may determine a recognition model with greater relevance between the input training data and basic training data as a recognition model. In this case, the basic training data may be classified by data type, and the recognition model may be established in advance by data type. For example, the basic training data may be pre-classified based on various criteria such as at least one of the area where the training data is generated, the time at which the training data is generated, the size of the training data, the genre of the training data, the creator of the training data, or the type of object in the training data, etc.

When the recognition model is trained, the model training module 1110-4 may store the trained recognition model. The model training module 1110-4 may store the trained recognition model in the memory 130 of the cleaning robot 100. The model training module 1110-4 may store the trained recognition model in the memory of the server connected to the cleaning robot 100 in a wired/wireless manner.

The training module 1110 may further include a training data preprocessor 1110-2 and a training data selector 1110-3 for improving the result of analyzing the recognition model, or saving resources or time necessary for generating a recognition model.

The training data pre-processor 1110-2 may preprocess the obtained data so that the obtained data may be used for training for determining a situation. The training data pre-processor 1110-2 may manufacture the obtained data in a predetermined format so that the model training module 1110-4 may use the obtained data for training for determining a situation.

The training data selector 1110-3 may select data obtained from the training acquisition part 1110-1, or data pre-processed by the training data preprocessor 1110-2 as data required for training. The selected training data may be provided to the model training module 1110-4. The training data selector 1110-3 may select training data necessary for training from among the obtained or pre-processed data according to predetermined criteria. In addition, the training data selector 1110-3 may select training data according to the predetermined criteria by training by the model training module 1110-4.

The training module 1110 may further include a model evaluation module 1110-5 to improve the analyzing result of the data recognition model.

The model evaluation module 1110-5, when evaluation data is input to a recognition model, but the result of analyzing output from the evaluation data does not satisfy a predetermined criterion, may cause the model training module 1110-4 to train again. The evaluation data may be pre-defined data for evaluating the recognition model.

For example, the model evaluation module 1110-5, when the number or ratio of evaluation data, which is not accurately analyzed, among the analyzing results of the trained recognition model with respect to the evaluation data, exceeds a predetermined threshold value, may evaluate that the data fails to meet the predetermined criterion.

When the trained recognition model includes a plurality of trained recognition models, the model evaluation module 1110-5 may evaluate whether each trained recognition model satisfies predetermined criteria, and determine a model satisfying the predetermined criteria as a final recognition model. In this case, when the recognition model satisfying the predetermined criteria includes a plurality of recognition models, the model evaluation module 1110-5 may determine any one or the predetermined number of recognition models preset in the order of high evaluation scores as a final recognition model.

Referring to part (b) of FIG. 11B, the recognition module 1120 according to some embodiments may include a data acquisition part 1120-1 and a recognition result provider 1120-4.

The recognition module 1120 may selectively include at least one of a recognition data pre-processor 1120-2, a recognition data selector 1120-3, and a model renewing module 1120-5.

The recognition data acquisition module 1120-1 may obtain data necessary for a situation determination. The recognition result provider 1120-4 may apply the data obtained from the recognition data acquisition module 1120-1 to the trained recognition model to determine a situation. The recognition result provider 1120-4 may provide the analyzing result according to the analyzing purpose of data. The recognition result provider 1120-4 may apply data selected by the recognition data pre-processor 1120-2 or the recognition data selector 1120-3 as an input value to the recognition model to obtain the analyzing result. The analyzing result may be determined by the recognition model.

For example, the recognition result provider 1120-4 may apply the object area including the object obtained from the recognition data acquisition module 1120-1 to the trained recognition model and obtain (or assume) the object information corresponding to the object area.

For another example, the recognition result provider 1120-4 may apply at least one of the object area, object information or context information obtained from the recognition data acquisition module 1120-1 to the trained recognition model to obtain (or assume) a search category to provide the search result.

The recognition module 120 may further include the recognition data pre-processor 1120-2 and the recognition data selector 1120-3 to improve the analyzing result of the recognition model, or to save resources or time for providing the analyzing result.

The recognition data pre-processor 1120-2 may preprocess the obtained data so that the data obtained for a situation determination may be used. The recognition data pre-processor 1120-2 may manufacture the obtained data in a predefined format so that the recognition result provider 1120-4 may use the data obtained for a situation determination.

The recognition data selector 1120-3 may select data obtained from the recognition data acquisition module 1120-1 or data pre-processed by the recognition data pre-processor 1120-2 as data necessary for a situation determination. The selected data may be provided to the recognition result provider 1120-4. The recognition data selector 1120-3 may select part of all of the obtained or pre-processed data according to predetermined criteria for a situation determination. The recognition data selector 1120-3 may select data according to the criteria preset by the training of the model training module 1110-4.

The model renewing module 1120-5 may control to renew the recognition model based on the analyzing result provided by the recognition result provider 1120-4. For example, the model renewing module 1120-5 may provide the analyzing result provided by the recognition result provider 1120-4 to the model training module 1110-4 to request the model training module 1110-4 to additionally train or renew the recognition model.

Figure 12:
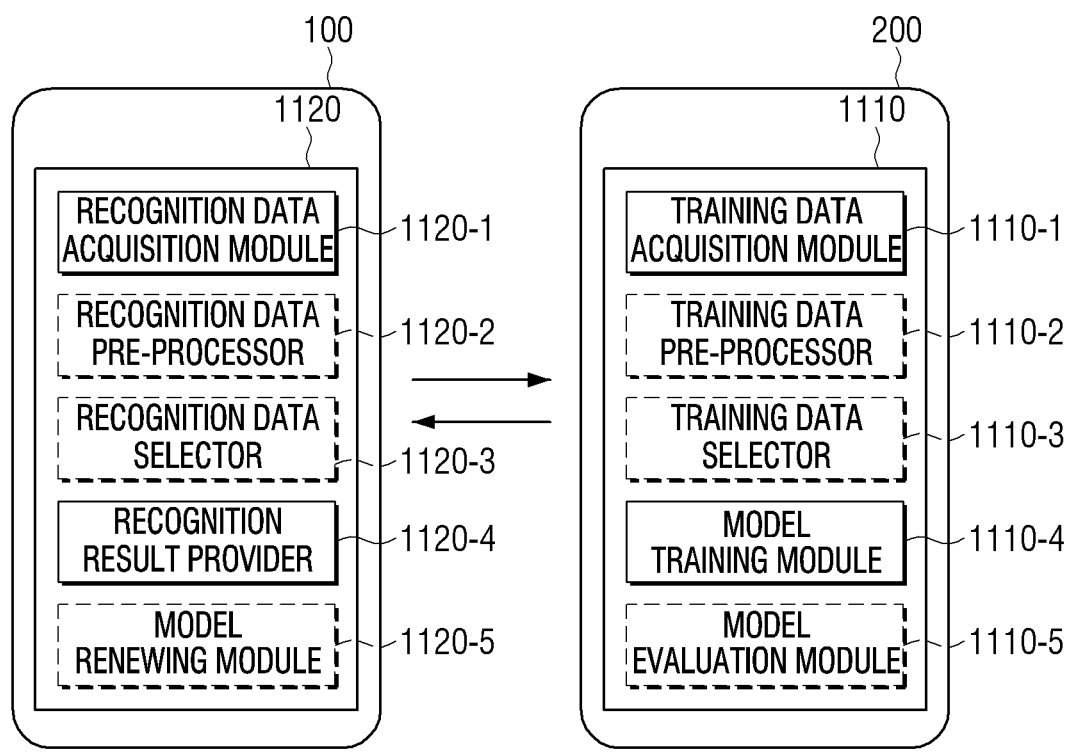
FIG. 12 is a view illustrating an example in which a cleaning robot and a server are operable in association with each other to train and recognize data.

FIG. 12 is a view illustrating an example in which a cleaning robot 100 and a server 200 are operable in association with each other to train and recognize data.

Referring to FIG. 12, the server 200 may train criteria for situation determination, and the cleaning robot 100 may determine the situation based on the training result.

The model training module 1110-4 of the server 200 may perform the function of the model training module 1110-4 shown in FIG. 11B. The model training module 1110-4 of the server 200 may train criteria which object image, object information or content information is to be used for the determining a predetermined situation, or how to determine a situation by using the data.

The recognition result provider 1120-4 of the cleaning robot 100 may apply the data selected by the recognition data selector 1120-3 to the recognition model generated by the server 200 to determine object information or a search category. The recognition result provider 1120-4 of the cleaning robot 100 may receive the recognition model generated by the server 200 from the server 200 and determine the situation using the received recognition model. In this case, the recognition result provider 1120-4 of the cleaning robot 100 may apply the object image selected by the recognition data selector 1120-3 to the recognition model received from the server 200 to determine object information corresponding to the object image. The recognition result provider 1120-4 may determine the search category for obtaining the search result by using at least one of context information or context recognition information.

Figure 13:
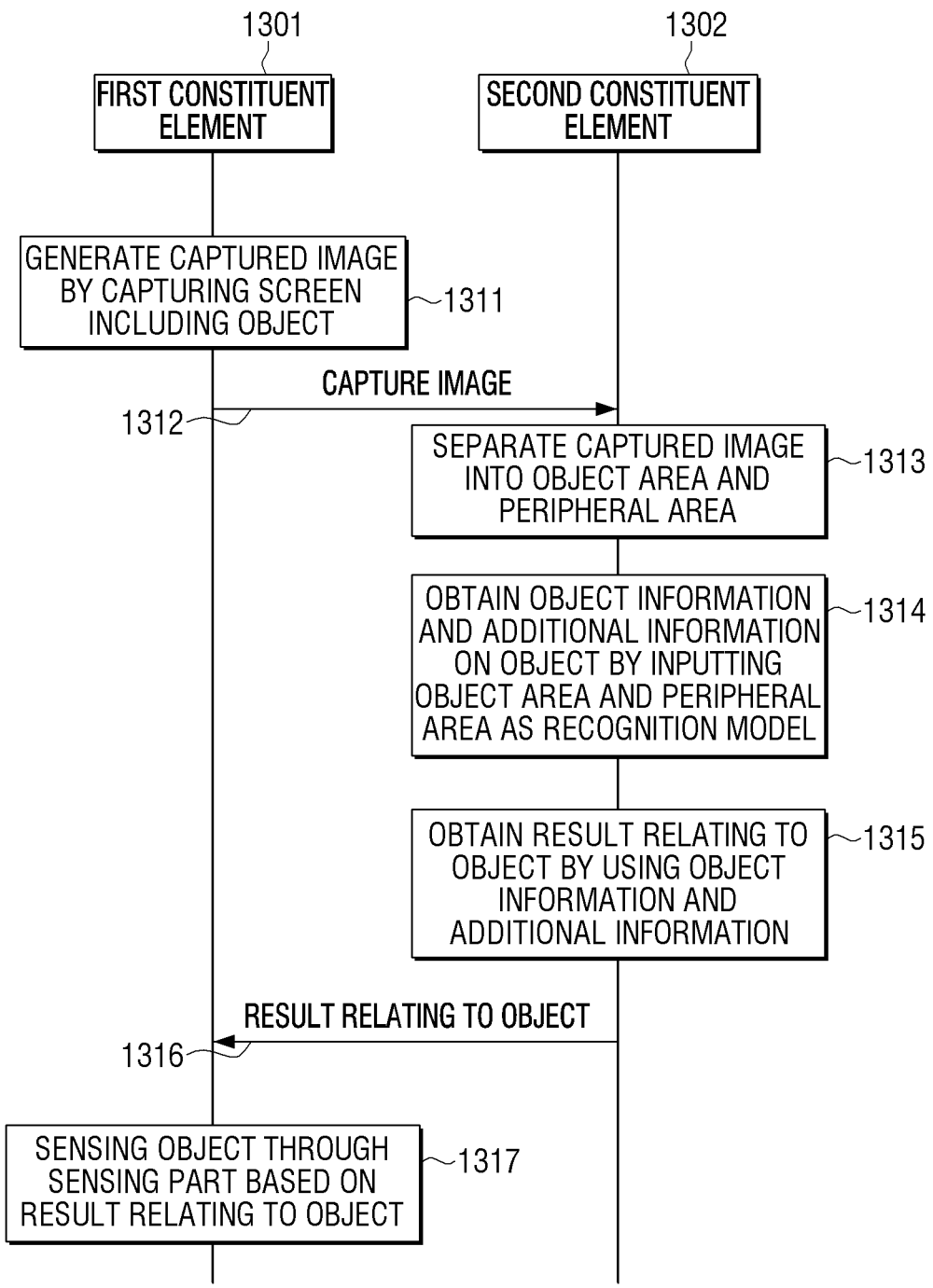
FIG. 13 is a flowchart to explain a network system using a recognition model according to an embodiment of the disclosure.

FIG. 13 is a flowchart to explain a network system using a recognition model according to an embodiment of the disclosure.

A first constituent element 1301 may be the cleaning robot 100, and a second constituent element 1302 may be the server 200 storing a recognition model. The first constituent element 1301 may be a general use processor, and the second constituent element 1302 may be an artificial intelligence specific processor. The first constituent element 1301 may include at least one application, and the second constituent element 1302 may include an operating system (OS). The second constituent element 1302 may be more integrated, specialized, delayed shorter, outperformed, or with more resources to process calculations required for generating, renewing or applying the data recognition model more quickly or effectively than the first constituent element 1301.

Referring to FIG. 13, the first constituent element 1301 may generate a capture image (e.g., the captured image) by capturing ambient environment including the object (e.g., an object arranged in the task area) at step S1311. For example, the first constituent element 1301 may include a camera that captures the captured image. The first constituent element 1301 may transmit the captured image to the second constituent element 1302 at step S1312. The first constituent element 1301 may transmit information on the object area corresponding to the selected object with the captured image.

The second constituent element 1302 may separate the received captured image into an object area and a peripheral area at step S1313. The second constituent element 1302 may separate the image into the object area and the peripheral area based on the received information on the object area.

The second constituent element 1302 may obtain object information and additional information on the object by inputting the separated object area and the peripheral area to the recognition model at step S1314. The second constituent element 1302 may obtain the object information by inputting the object area to the object recognition model, and obtain additional information on the object by inputting the peripheral area to the peripheral information recognition model. In addition, the second constituent element 1302 may determine the search category and the priority of the search category based on the object information and the additional information on the object.

The second constituent element 1302 may obtain the result relating to the object by using the obtained object information and the additional information at step S1315. The second constituent element 1302 may apply the object information and the additional information to the recognition model as input data and obtain the result related to the object. The second constituent element 1302 may obtain the result by using the search category. The second constituent element 1302 may obtain a result by using additional data (e.g., the degree of risk of obstacles, and/or the degree of importance of the obstacle with respect to the user) other than the object information and the additional information. The additional data may be transmitted from the first constituent element 1301 or the other constituent element or pre-stored in the second constituent element 1302.

When the second constituent element 1302 transmits the result relating to the object to the first constituent element 1301 at step S1316, the first constituent element 1301 may detect the object through the sensor based on the result related to the received object at step S1317.

Figure 14:
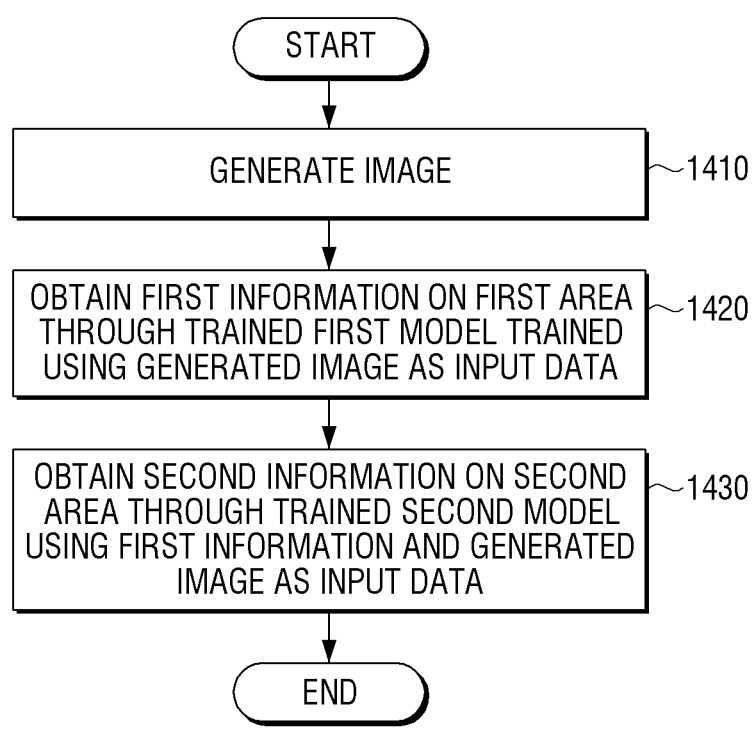
FIG. 14 is a flowchart to explain an example in which a cleaning robot provides a search result for a first area using a recognition model according to an embodiment of the disclosure.

FIG. 14 is a flowchart to explain an example in which a cleaning robot provides a search result for a first area using a recognition model according to an embodiment of the disclosure.

Referring to FIG. 14, the cleaning robot 100 may generate an image by capturing or photographing the ambient environment of the cleaning robot 100 at step S1410. The cleaning robot 100 may obtain first information on the first area through the first model trained using the generated image as input data. The first model may be stored in the cleaning robot 100, but is not limited thereto. The first model may be stored in the external server.

The cleaning robot 100 may obtain second information on the second area through the trained second model that uses the first information and the generated image as input data at step S1430. The first model may be stored in the cleaning robot 100, but is not limited thereto. The first model may be stored in the external server.

When the first model and the second model are stored in the external server, the cleaning robot 100 may transmit the generated image to the external server, which may input the image to the first model to receive the first information and input the image and the first information into the second model to receive second information.

Therefore, information regarding the first area may be obtained more accurately by obtaining second information on the second area, which may be an area that is near the first area, as well as the first information on the first area in which the user input is detected.

Figure 15:
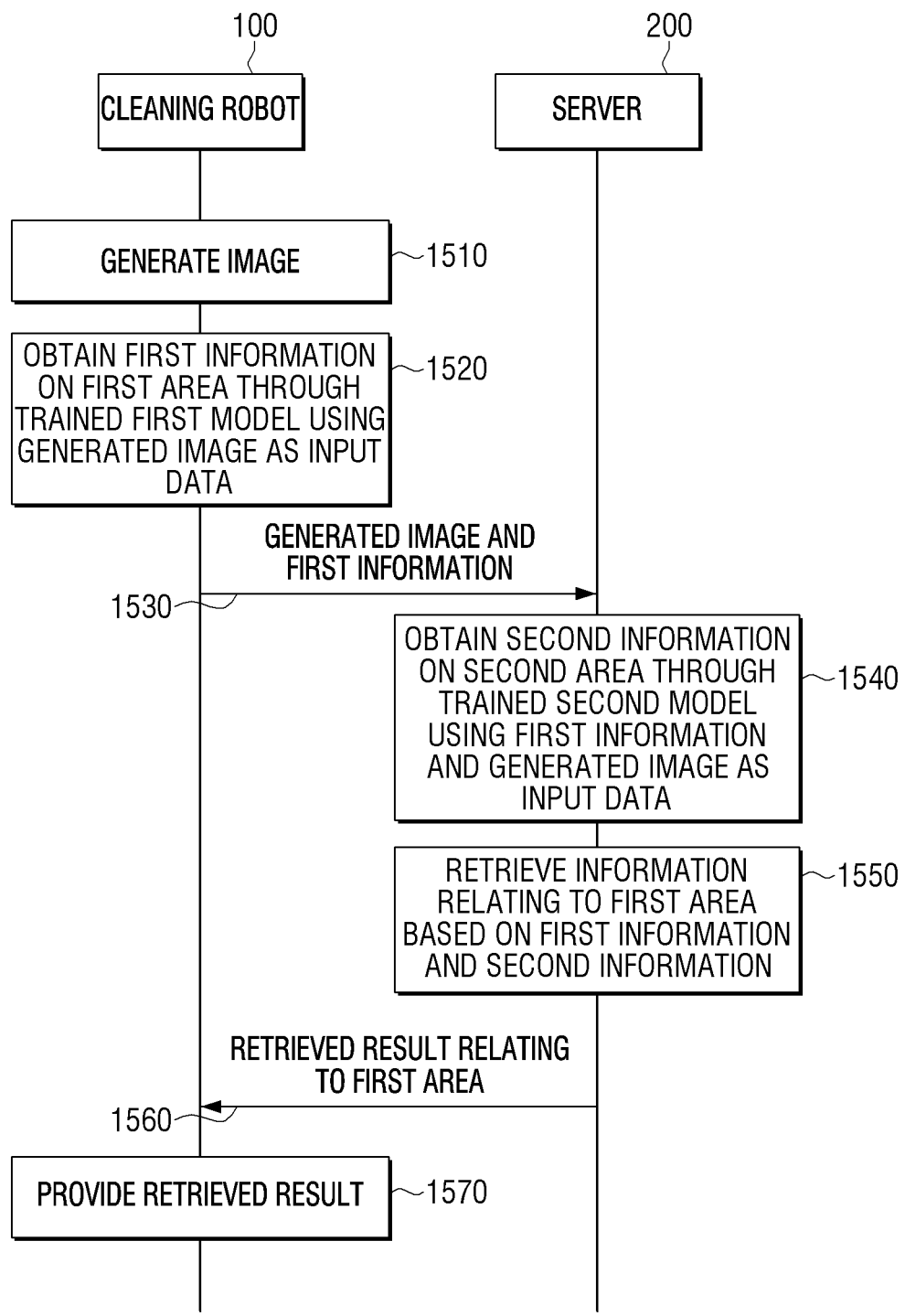
FIG. 15 is a flowchart to explain a system using a recognition model according to an embodiment of the disclosure.

FIG. 15 is a flowchart to explain a system using a recognition model according to an embodiment of the disclosure.

Referring to FIG. 15, the cleaning robot 100 may generate an image by capturing or photographing ambient environment at step S1510. The cleaning robot 100 may obtain first information on the first area through the trained first model that uses the generated image as input data at step S1520.

The cleaning robot 100 may transmit the generated image and the first information to the server 200 at step S1530.

The server 200 may obtain the second information on the second area through the trained second model that uses the first information and the generated image as input data at step S1540.

The server 200 may retrieve information regarding the first area based on the first information and second information at step S1550.

The server 200 may transmit the information regarding the first area (e.g., a search result related to the first area) to the cleaning robot 100 at step S1560, and the cleaning robot 100 may provide the received information (e.g., the search result) at step S1570, such as, by causing a display to display the received search result.

The operation for obtaining the first information through the first model for recognizing the object may be performed by the cleaning robot 100, or the operation of obtaining the second information through the second model for assuming context information may be performed by the server 200. In other words, the object recognition operation for processing information with a small amount of processing may be performed by the cleaning robot 100, and the context estimation operation with a great amount of processing may be performed by the server 200.

Referring to FIG. 15, the server 200 may obtain first information or second information through the trained model, and retrieve information related to the first area, but is not limited thereto. The plurality of servers may perform the above operation by each. That is, the first server may obtain the first information and the second information through the trained model, and the second server may retrieve information on the first area based on the first information and the second information obtained by the first server, but is not limited thereto. All the processes performed by the server 200 may be performed by the cleaning robot 100.

Figure 16:
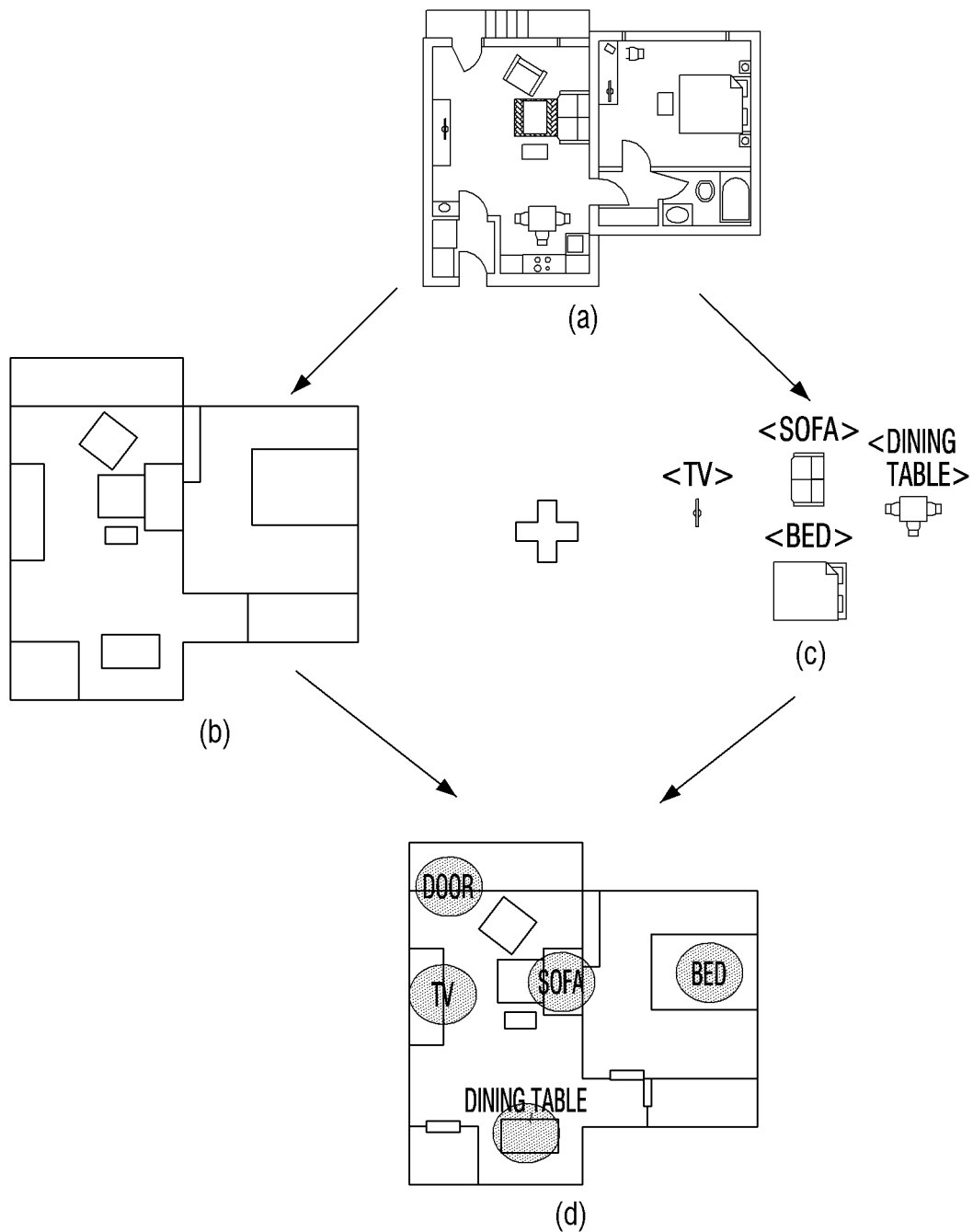
FIG. 16 is a view to explain generating a semantic map according to an embodiment of the disclosure.

FIG. 16 is a view to explain generating a semantic map according to an embodiment of the disclosure.

Referring to FIG. 16, the cleaning robot 100 may generate a navigation map as in part (b) of FIG. 16 with respect to the task area in part (a) of FIG. 16. For example, the cleaning robot may detect a task area using at least one of an IR stereo sensor, an ultrasonic sensor, a LIDAR sensor, a position sensitive diode (PSD) sensor, or an image sensor. The cleaning robot may generate a navigation map for driving the cleaning robot by using the result of detection of a task area. It is preferable to generate a navigation map in 2-D (two-dimensions) in FIG. 16. The navigation map, for example, may be displayed to be divided by at least one 2-D line.

The cleaning robot 100 may detect an object in the task area using at least one of the camera 120, the object recognition sensor, the IR stereo sensor, the ultrasonic sensor, the LIDAR sensor, or the image sensor with respect to the task area. The cleaning robot may apply the result of detecting the object to the trained artificial intelligence model and obtain the recognition information of the object. The result of detecting the object may be, for example, may include the capturing image of the object, the depth information of the object, the material information of the object, and/or the reflection coefficient of the object, but is not limited thereto.

The cleaning robot 100 may obtain a name for each of one or more objects as in part (c) of FIG. 16 as the recognition information of the object. In addition, the cleaning robot 100 may obtain at least one of the type of object, the size of object (e.g., the height of the object, the width of the objet, the depth of the object, etc.) or the feature of the object (e.g., the color of the object, the material of the object, etc.), but is not limited thereto.

The cleaning robot 100 may generate a semantic map indicating environment information of a task area in which the cleaning robot 100 performs a task by mapping the area of the object included in the navigation map with the recognition information of the object. The cleaning robot 100 may identify the boundary of the object corresponding to the object in the navigation map. When the boundary of the object is identified, the cleaning robot 100 may determine the area of the object by the boundary of the object.

When the area of the object is determined, the cleaning robot 100 may map the area of the object with the recognition information of the object.

The cleaning robot 100 may map the area of the object included in the navigation map with the recognition information of the object based on the location of the object according to the detection result of the object. The cleaning robot 100 may map the area of the object included in the navigation map with the recognition information of the object when the location of the object in a situation in which the object is detected to generate a navigation map (e.g., when the detection result of the object is obtained), and the location of the object in a situation in which the object for obtaining the recognition information of the object is detected (e.g., when the detection result of the object is obtained, or the image of the object is stored) is the same or similar to each other within a threshold range.

The cleaning robot 100 may map the area of the object included in the navigation map with the recognition information of the object based on the form of the object according to the result of detecting the object. The cleaning robot 100 may compare the form of the object according to the result of detecting the object for generating the navigation map with the form of the object included in the recognition information of the object, and when the two forms are similar or the same with each other, may map the area of the object included in the navigation map with the recognition information of the object.

Referring to part (d) of FIG. 16, as a result of mapping the area of the object with the recognition information of the object, the cleaning robot 100 may generate a semantic map indicating the environment of the task area. The cleaning robot 100 may display the generated semantic map on the display. When the cleaning robot 100 transmits the generated semantic map to the external user terminal device, the user terminal device may display the semantic map through the display.

The user terminal device or the external server may generate a semantic map. For example, when the cleaning robot 100 transmits the navigation map and the recognition information of the object to the user terminal device or the external server, the user terminal device or the external server may generate a semantic map. For another example, when the cleaning robot 100 transmits the navigation map and the result of detecting the object to the user terminal device or the external server, the user terminal device or the external server may generate the semantic map.

The recognition information of the object may be displayed in text (e.g., the name of the object) or icon in the object area of the semantic map. The recognition information of the object may be displayed in the object area of the semantic map in the reference form. To be specific, the recognition information of the object may be displayed as to the instruction line indicating the object area, or the area of the object may be distinguished by color, so that the recognition information of the object may be displayed based on the color.

Figure 17:
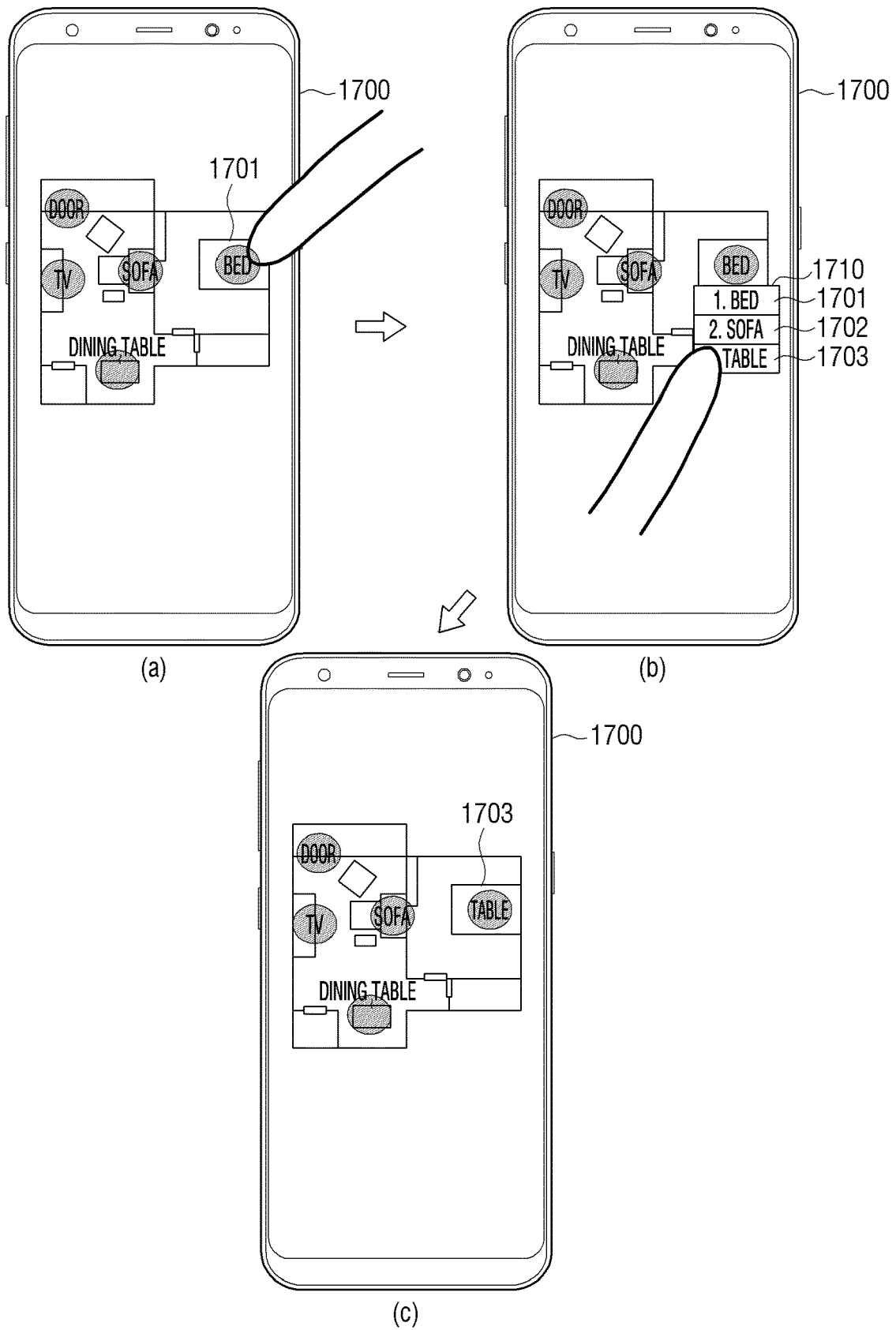
FIG. 17 is a view illustrating a user interface for the use of a semantic map according to an embodiment of the disclosure.

FIG. 17 is a view illustrating a user interface for the use of a semantic map according to an embodiment of the disclosure.

Referring to part (a) of FIG. 17, the user terminal device 1700 may display a semantic map. The semantic map, for example, may be generated through the process of FIG. 16. For example, the recognition information of the object may be displayed in the background of at least one of the 3-D (dimension) map in which the structure of the task area is reflected, or the navigation map (e.g., LIDAR map) in the semantic map.

For example, a bed 1701 may be displayed as the recognition information of the object in at least part of the object area of the semantic map. In this case, a user may select the bed 1701, which is the recognition information.

In response to selection of a user, the user terminal device 1700 may display a drop-down box 1710 relating to the selected recognition information 1701 as in part (b) of FIG. 17. The names of the object representing the selected recognition information may be displayed in the drop-down box 1710. For example, as a result of applying the object detection result to the trained artificial intelligence model, the object recognizing result may be recognized as bed 50%, sofa 30%, table 20%, etc. In this case, in the order of high recognition results, the names applicable to the objects may be sequentially displayed in the drop-down box 1710. For example, the bed 1701 may be displayed in the first field, the sofa 1702 may be displayed in the second field, and a table 1703 may be displayed in the third field in the list of the drop-down box 1710.

When a user selects one name (e.g., the table 1703), referring to part (c) of FIG. 17, the user terminal device 1700 may display recognition information 1703 of the changed object on the navigation map.

Figure 18:
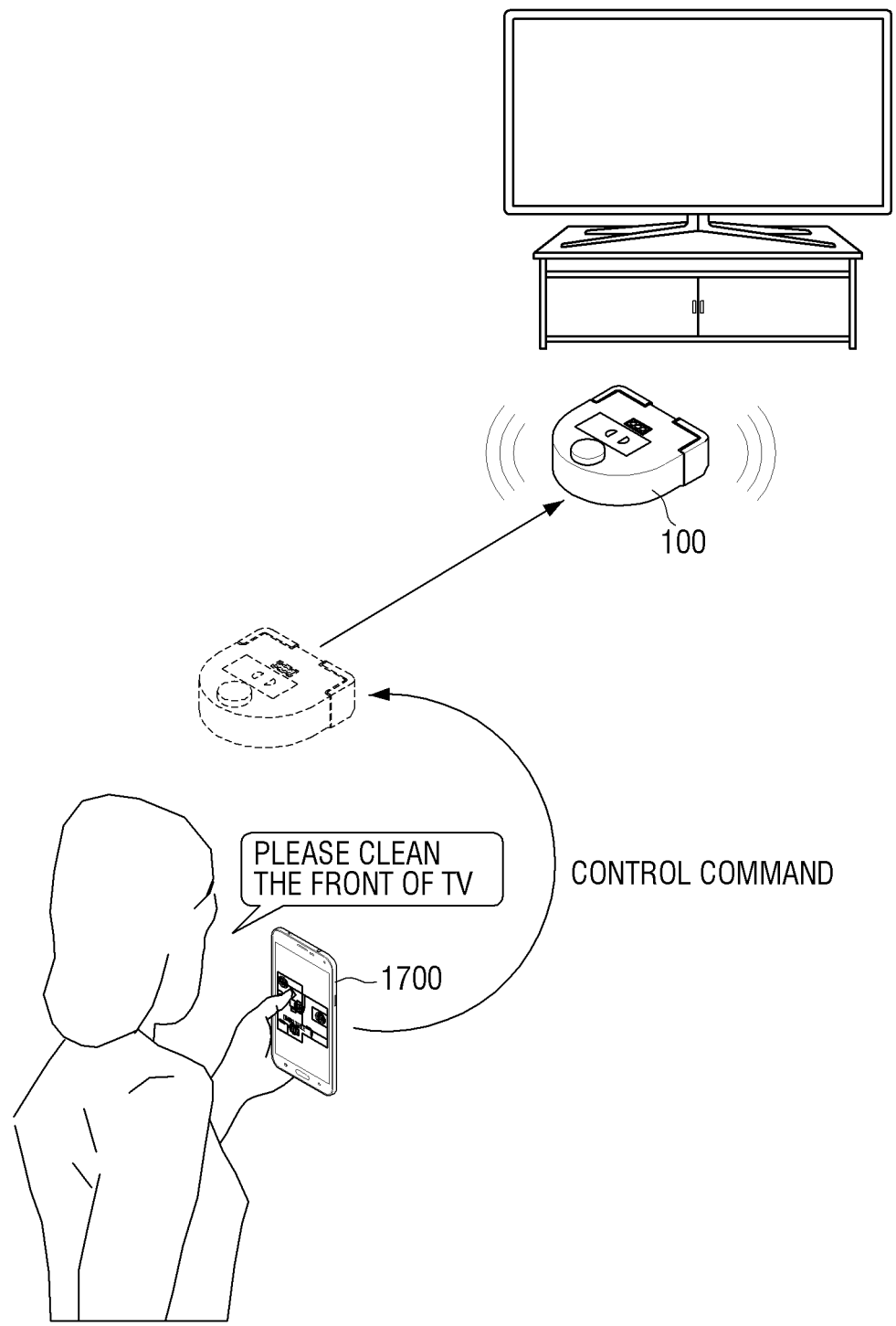
FIG. 18 is a view illustrating a situation in which a cleaning robot is controlled by using a semantic map according to an embodiment of the disclosure.

FIG. 18 is a view illustrating a situation in which a cleaning robot is controlled by using a semantic map according to an embodiment of the disclosure.

Referring to FIG. 18, the user may perform a control command by using recognition information of the object displayed on the semantic map provided from the user terminal device 1700. For example, recognition information of at least one object displayed on the semantic map in FIG. 16 and FIG. 17 may be displayed on the display of the user terminal device 1700. In this case, the user may utter 'please clean the front of TV' for designating the cleaning area.

According to the utterance command of the user, the user terminal device 1700 may recognize the utterance command of the user and transmit the control command of the user corresponding to the recognized utterance command to the cleaning robot 100. The control command may be the command for request execution of the task with respect to the area of a specific object. The cleaning robot 100 may perform a task based on the control command of the user. For example, the cleaning robot 100 may move toward the TV and clean the front of the TV.

Figure 19:
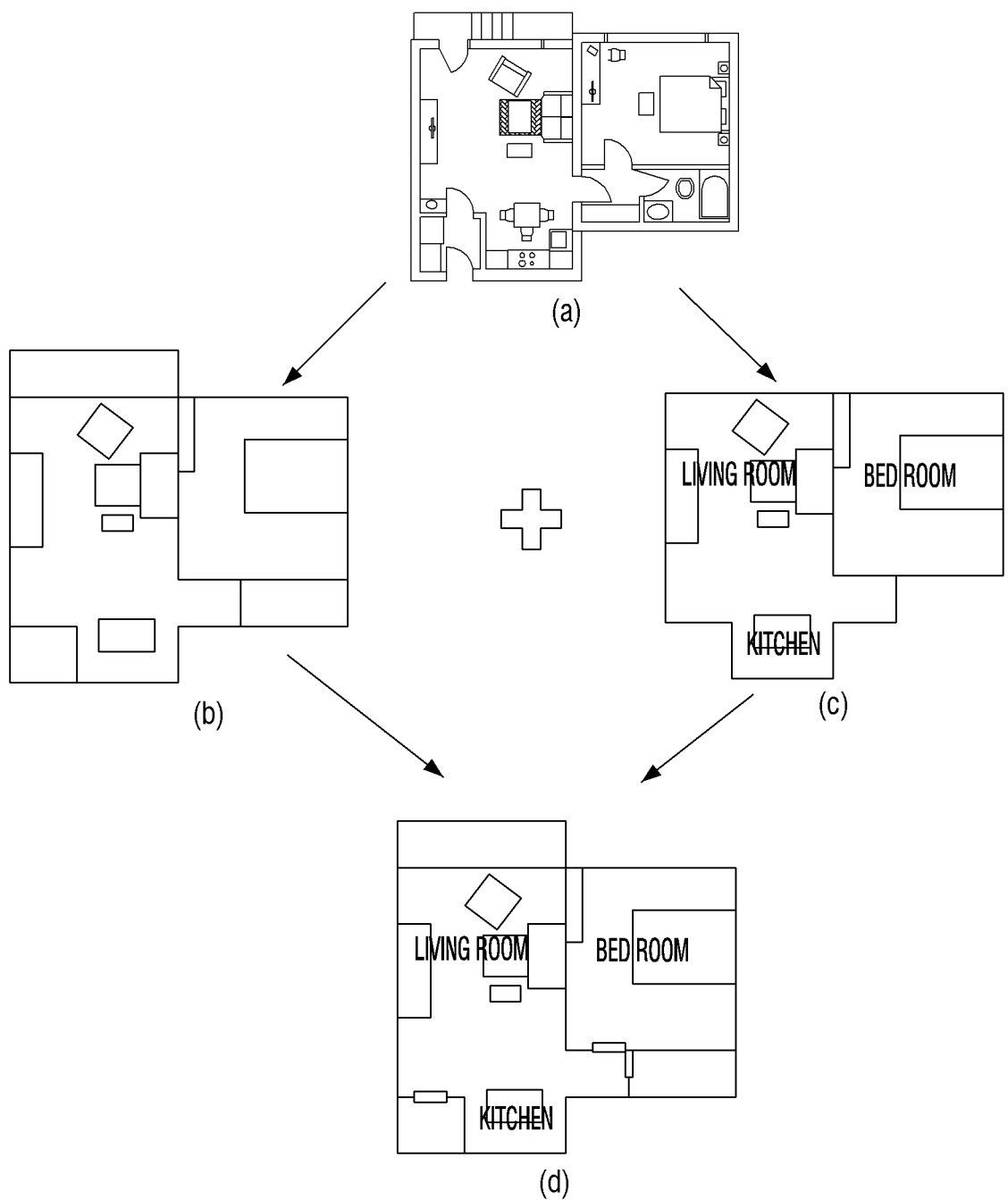
FIG. 19 is a view to explain generating a semantic map according to an embodiment of the disclosure.

FIG. 19 is a view to explain generating a semantic map according to an embodiment of the disclosure.

Referring to FIG. 19, the cleaning robot 100 may generate a navigation map in part (b) of FIG. 19 with respect to the task area in part (a) of FIG. 19. The detailed description of generating the navigation map may correspond to the descriptions of parts (a) and (b) of FIG. 16. Thus, the repeated description will be omitted.

The cleaning robot 100 may obtain recognition information of each place of the task area using the result of detecting the task area in part (a) of FIG. 19. For example, the cleaning robot 100 may obtain the name for each place in part (c) of FIG. 19 as recognition information.

The cleaning robot 100 may apply a plurality of images capturing respective places of the task area to the trained artificial intelligence model to obtain the recognition information of each place in the task area.

Referring to FIG. 7A, and FIG. 7B, the cleaning robot 100 may detect the object to recognize the doors 700 and 710, and determine the structure of the task area using the recognized doors 700 and 710. The cleaning robot 100 may obtain recognition information of each place distinguished as the structure of the task area. For example, the cleaning robot 100 may recognize the doors 700 and 710 most, recognize the largest are as living room, and recognize the second largest area as bedroom.

The cleaning robot 100 may obtain the recognition information of each place in the task area by using the recognition information of the object located in each place of the task area. For example, the cleaning robot 100 may determine the area having the table as kitchen, the area having the bed as bedroom, and the area having TV or sofa as living room.

When obtaining recognition information of each place, the cleaning robot 100 may generate a semantic map indicating the environment of the task area as in part (d) of FIG. 19 using the navigation map and the obtained recognition information of each place. The cleaning robot 100 may display the generated semantic map through the display. In addition, when the cleaning robot 100 transmits the generated semantic map to the external user terminal device, the user terminal device may display the semantic map through the display.

The user terminal device or the external server may generate a semantic map. For example, when the cleaning robot 100 transmits the navigation map and the recognition information of each place to the user terminal device or the external server, the user terminal device or the external server may generate the semantic map. For another example, when the cleaning robot 100 transmit the navigation map, and the result of detecting the object included in each place of the task area to the user terminal device or the external server, the user terminal device or the external server may generate a semantic map.

Figure 20:
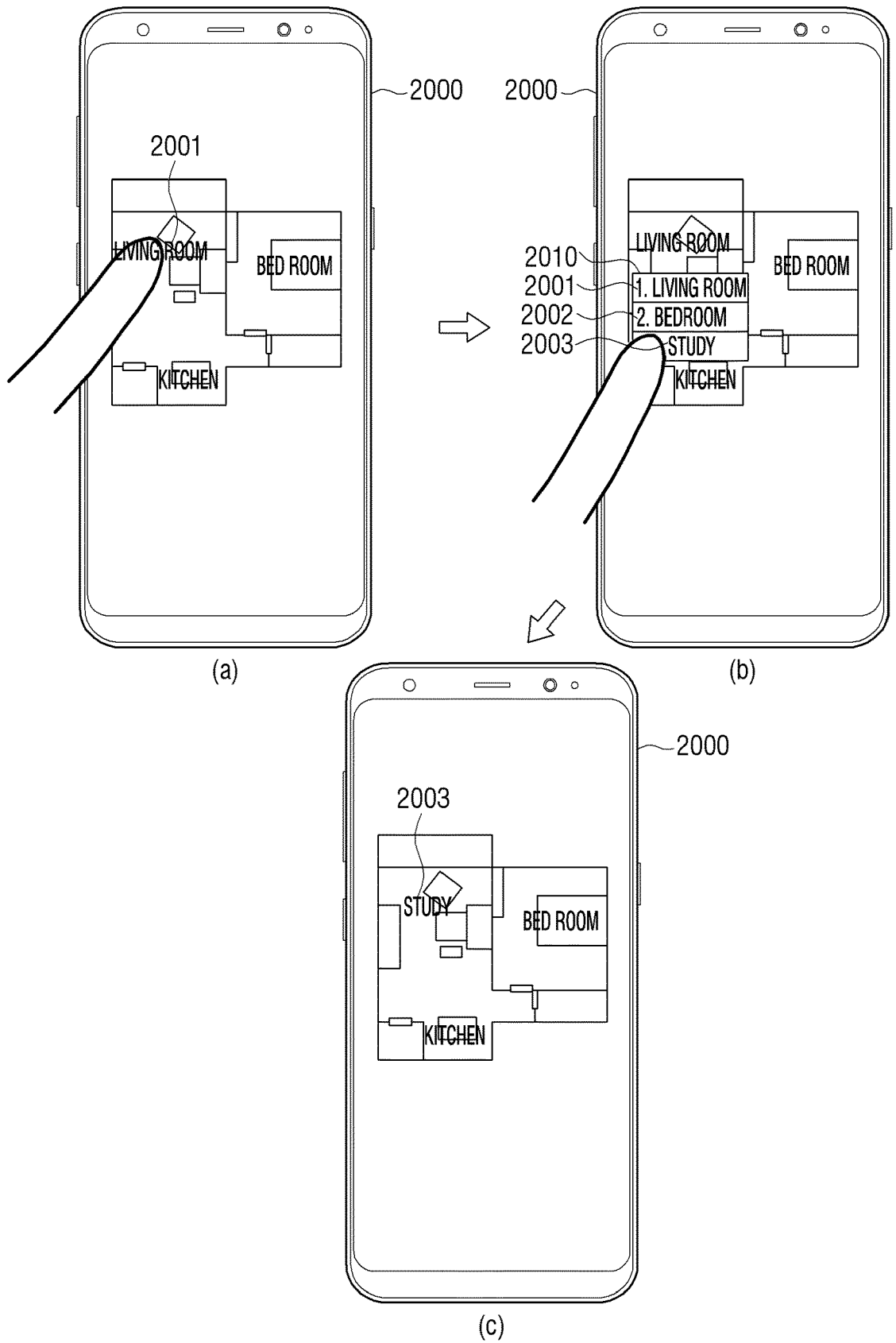
FIG. 20 is a view illustrating a user interface for the use of a semantic map according to an embodiment of the disclosure.

FIG. 20 is a view illustrating a user interface for the use of a semantic map according to an embodiment of the disclosure.

Referring to part (a) of FIG. 20, a user terminal device 2000 may display a semantic map. The semantic map, for example, may be generated through the process in FIG. 19. For example, the recognition information of the object may be displayed in the background of at least one of 3D map into which the structure of the task area is reflected, or the navigation map on the semantic map.

For example, a living room 2001 may be displayed as recognition information of one place on at least one part of the object. In this case, the user may select the living room 2001 as recognition information.

In response to the selection of a user, the user terminal device 2000 may display a drop-down box 2010 related to the selected recognition information 2001 in part (b) of FIG. 20, the names of places to be replaced with the selected recognition information may be displayed in the drop-down box 2010. For example, as a result of applying the image captured in one place to the trained artificial intelligence model, the recognition result of one place may be living room 50%, bedroom 30%, and study 20%. In this case, according to the order of recognition result value, the names applicable to one place may be sequentially displayed in the drop-down box 2010. For example, the living room 2001 may be displayed in the first field, the bedroom 2002 may be displayed in the second field, and a study 2003 may be displayed in the third field in the list of the drop-down box 2010.

When the user selects one name (e.g. the study 2003), referring to part (c) of FIG. 20, the user terminal device 2000 may display recognition information 2003 of the changed place on the navigation map.

Figure 21:
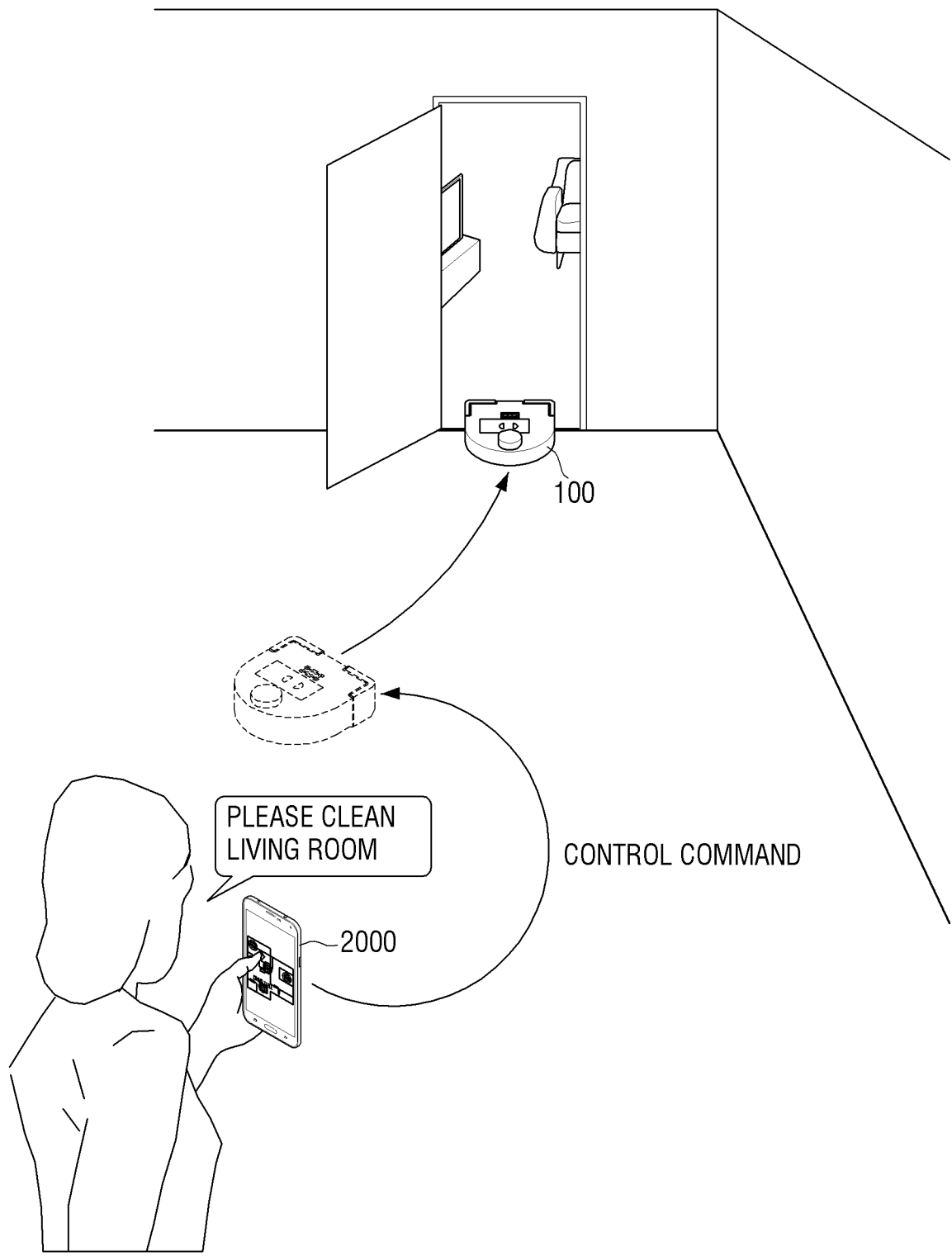
FIG. 21 is a view illustrating a situation in which a cleaning robot is controlled by using a semantic map according to an embodiment of the disclosure.

FIG. 21 is a view illustrating a situation in which a cleaning robot is controlled by using a semantic map according to an embodiment of the disclosure.

Referring to FIG. 21, the user may perform a control command by using recognition information of each place displayed on the semantic map provided from the user terminal device 2000. For example, the recognition information of each place on the semantic map in FIG. 19 and FIG. 20 may be displayed on the display of the user terminal device 2000. In this case, the user may utter 'please clean the living room' for designating the cleaning area.

According to an utterance command of the user, the user terminal device 2000 may recognize the utterance command of the user, and transmit the control command of the user corresponding to the recognized utterance command of the user to the cleaning robot 100. The control command of the user may be the command requesting execution of the task with respect to a specific place. The cleaning robot 100 may perform a task based on the control command of the user. For example, the cleaning robot 100 may move toward the living room and clean the living room.

A user terminal device may display a semantic map including both the recognition information of the object in part (a) of FIG. 17 and recognition information of each place in part (a) of FIG. 20. In this case, when one of the recognition information of the object and the recognition information of each place is selected, the user terminal device may provide a user interface that changes the selected recognition information.

For example, the user terminal device may provide a candidate list that can change the selected recognition information. The changeable names may be included in the candidate list, and the names may be arranged according to the order of high probability values considering the recognition result of the artificial intelligence model. When a user input for selecting one name is input, the user terminal device may change the recognition information of the existing object to the selected name and display the information.

Figure 22:
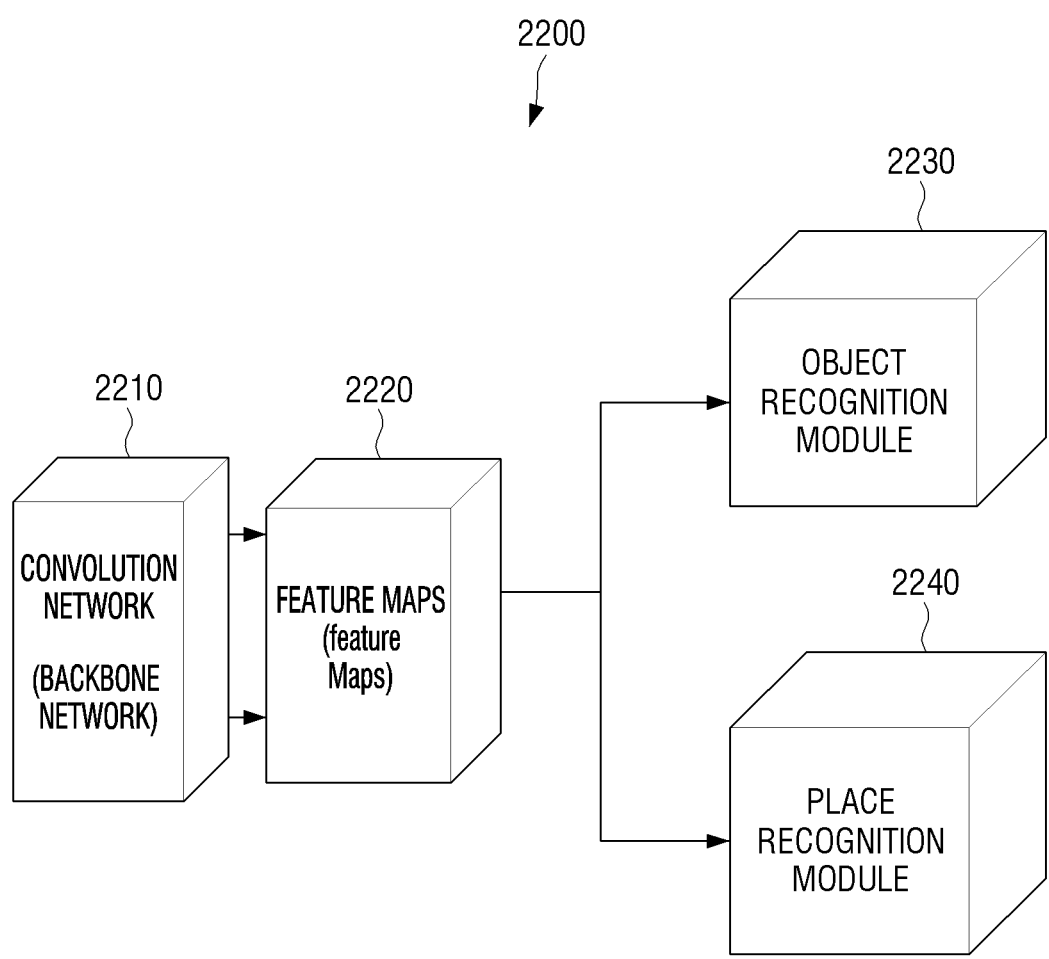
FIG. 22 is a view illustrating a process of recognizing an object according to an embodiment of the disclosure.

FIG. 22 is a view illustrating a process of recognizing an object according to an embodiment of the disclosure.

The cleaning robot 100 may apply to the image of the object captured by the camera 120 to the trained artificial intelligence model to obtain the recognition information of the object. The cleaning robot 100 may apply the image of the place in the task area captured by the camera 120 to obtain the recognition information of the place.

For another example, when the cleaning robot 100 captures an object in a specific area, the cleaning robot 100 may apply the captured image to the trained artificial intelligence model to obtain the recognition information of the object together with the recognition information of the place. To be specific, an electronic apparatus including the artificial intelligence model 2200 (e.g., an external server) may apply the feature map in a vertical direction 2220 generated through an object recognition network 2210 (a convolution network model) to the classifier, and perform an object recognition module 2230 recognizing the object and a place recognition module 2240 for recognizing the place of the object. However, the step of training may be simplified as loss for recognizing the object and loss for recognizing the place are both trained.

With respect to the captured image, when the recognition of the object and place are both performed, more accurate recognition of the object may be possible. For example, the recognition result of the object included in the captured image may be table 50%, dining table 30%, and the desk 20%. When the place having the object is recognized as kitchen, an electronic apparatus 2300 may recognize the object as dining table, not table. For another example, when the object and the place having the object are recognized as the table and the study room, respectively, the object may be recognized as desk. As another example, when the object and the place having the object are recognized as front door and door, respectively, the object may be recognized as the front door. As another example, when the object and the place having the object are recognized as room and door, respectively, the object may be recognized as the door. As another example, when the object and the place having the object are recognized as threshold and room, respectively, the object may be recognized as threshold. As another example, when the object and the place having the object are recognized as threshold and balcony, respectively, the object may be recognized as balcony threshold.

With respect to the captured image, when an object and a place including the object are recognized together through a single network, the electronic apparatus 2200 or the cleaning robot 100 may effectively generate a semantic map indicating the environment of the task area. For example, not only the recognition information of the object, but also the place information of the object may be displayed on the semantic map.

Figure 23:
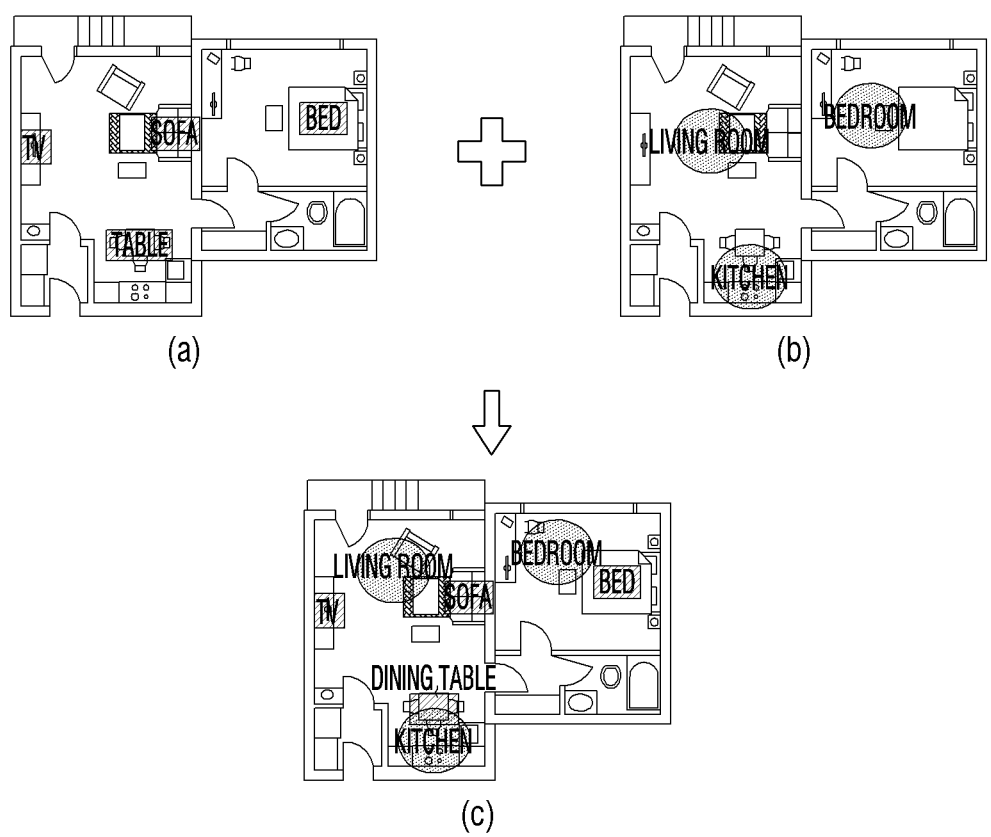
FIG. 23 is a view to explain a process of generating a semantic map according to an embodiment of the disclosure.

FIG. 23 is a view to explain a process of generating a semantic map according to an embodiment of the disclosure.

When the cleaning robot 100 applies the image captured by the camera 120 to the network included in the electronic apparatus 2200, at least one of recognition information of the object or the recognition information of the place (e.g., context of the place) may be displayed on the semantic map.

For example, the cleaning robot 100 may apply the captured image to the object recognition module 2230 in FIG. 22 to generate a first semantic map as in part (a) of FIG. 23. As the recognition information of the object in the first semantic map of part (a) of FIG. 23, the name of the object may be displayed in the position correspond to the object. The cleaning robot 100 may generate a second semantic map as in part (b) of FIG. 23 by applying the captured image to a place recognition module 2240 of FIG. 22. The name of the place may be displayed on the area corresponding to the place among divided areas of the task area in the semantic map as the recognition information of the place.

The cleaning robot 100 may combine the first semantic map of part (a) of FIG. 23 with the second semantic map of part (b) of FIG. 23 to generate a final semantic map. The name and place of the object existing in the task area may be displayed together in the final semantic map of part (c) of FIG. 23 as environment information of the task area.

Figure 24:
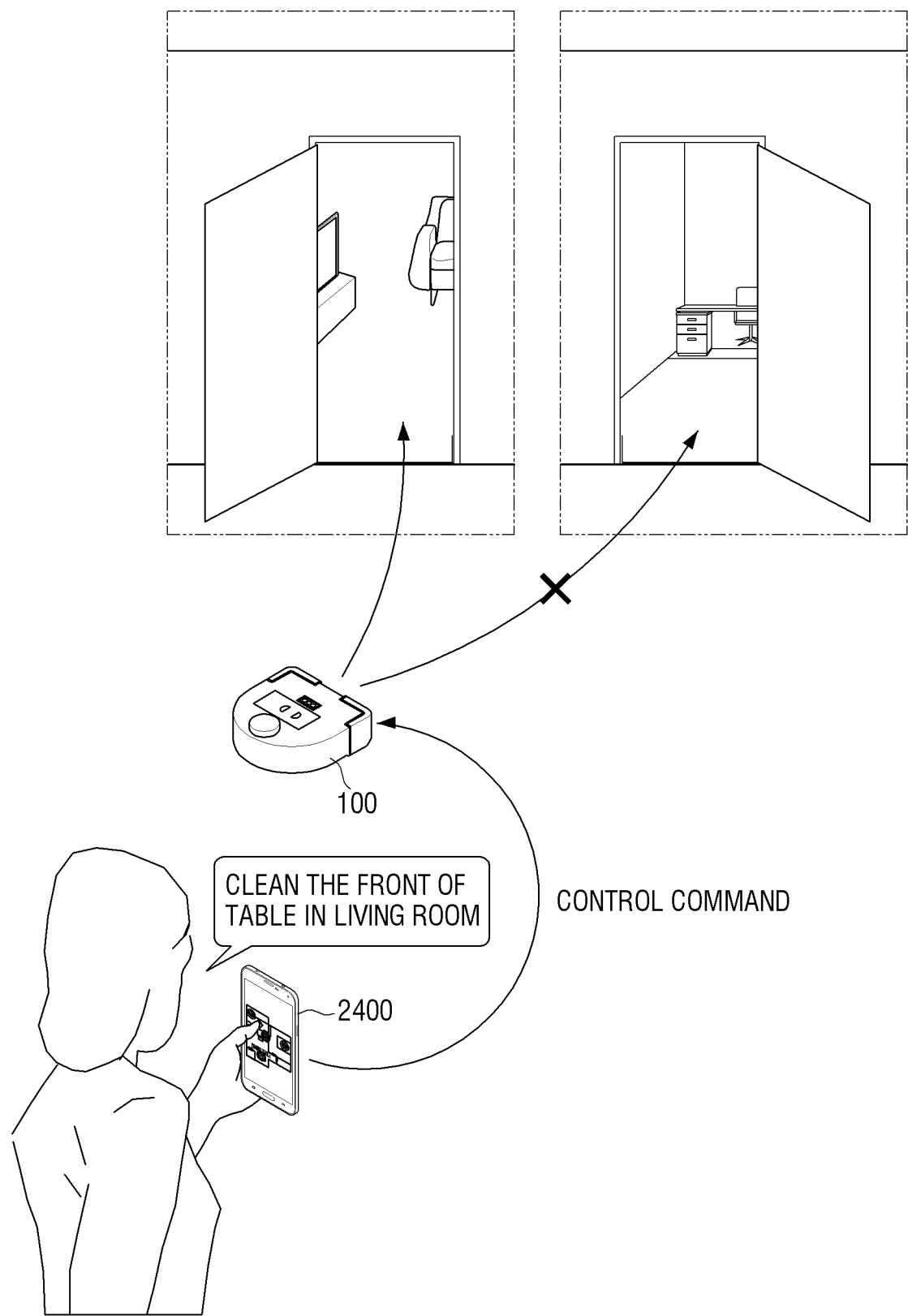
FIG. 24 is a view illustrating a situation in which a cleaning robot is controlled by using a semantic map according to an embodiment of the disclosure.

FIG. 24 is a view illustrating a situation in which a cleaning robot is controlled by using a semantic map according to an embodiment of the disclosure.

Referring to FIG. 24, the user may perform a control command by using recognition information of each object and place displayed on the semantic map provided from a user terminal device 2400. For example, the recognition information of each object and place displayed on the semantic map of FIG. 23 may be displayed on the display of the user terminal device 2400. In this case, a user may utter 'please clean the front of the table in the living room' to designate the cleaning area.

According to utterance command of a user, the user terminal device 2400 may recognize the utterance command of the user. The user terminal device 2400 may transmit the control command of the user corresponding to the recognized utterance command to the cleaning robot 100. The control command may be a command for performing a task with respect to the area of a specific object located in the specific place. The cleaning robot 100 may perform a task based on the control command of the user. For example, the cleaning robot 100 may move toward the table in the living room, among the places having the tables (the living room or the study), and clean the front of the table.

In various embodiments, in FIG. 18, FIG. 21, and FIG. 24, the cleaning robot 100 may directly recognize the user's utterance command according to the user's utterance command. In this case, the cleaning robot 100 may include at least one of an automatic speech recognition (ASR) module for recognizing a user's utterance command, a natural language understanding (NLU) module, a path planner module, or the like. In this case, as a user utters for designating the cleaning area, the cleaning robot 100 may recognize the utterance command of the user by using at least one of the modules. The cleaning robot 100 may perform a task according to the recognized control command of the user. For example, the cleaning robot 100 may perform a task according to a control command of the user based on the environment information included in the stored semantic map (e.g., the name of object, the name of object, etc.)

Referring to FIG. 18, FIG. 21, and FIG. 24, according to an utterance command of a user, a third voice recognition device (e.g., a home voice recognition hub, an artificial intelligence speaker, etc.) may recognize the utterance command of the user. The third voice recognition device may include at least one of an automatic voice recognition module, an automatic voice recognition module, a natural language understanding module, and a pass planer module. The third voice recognition device may recognize the utterance command of the user and transmit the control command of the user corresponding to the recognized utterance command to the cleaning robot 100. Accordingly, the cleaning robot 100 may perform a task according to a control command of the user with minimizing the limitation on the place or device.

Figure 25:
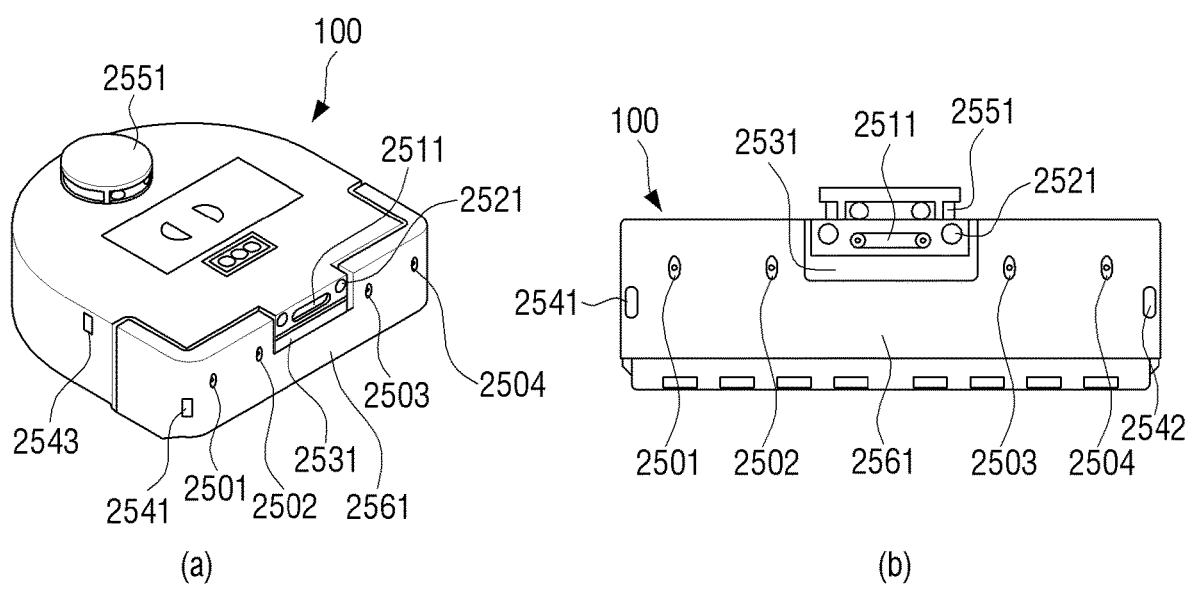
FIG. 25 is a view illustrating a configuration of a cleaning robot according to an embodiment of the disclosure.

FIG. 25 is a view illustrating configuration of a cleaning robot according to an embodiment of the disclosure.

Part (a) of FIG. 25 is a perspective view illustrating a cleaning robot 100 including a plurality of sensors, and part (b) of FIG. 25 is a front view illustrating the cleaning robot 100 including a plurality of sensors.

The cleaning robot 100 shown in FIG. 25 may include a plurality of sensors and include at least one of an IR stereo sensor, a LIDAR sensor, an ultrasonic sensor, a 3D sensor, a material recognition sensor, a fall detection sensor, a position sensitive diode (PSD) sensor, or the like.

The function of the IR stereo sensor, the LIDAR sensor, and the ultrasonic sensor has been described in detail with reference to FIG. 2, and the detailed description thereof will be omitted. The ultrasonic sensor may consist of, for example, two light emitting sensor modules and two light receiving sensor modules. The cleaning robot 100 may detect the object on the front side using a 3D sensor and extract a 3-dimensional shape of the object. Accordingly, the cleaning robot 100 may obtain information on the size and distance of the object. The cleaning robot 100 may detect the object on the front side by using an object recognition sensor to obtain the type of object. For example, the cleaning robot 100 may capture an object using a camera included in the object recognition sensor, and apply the captured image to the trained artificial intelligence model to obtain the type of object as the application result. The cleaning robot 100 may recognize a step of the bottom (e.g., a step between the living room bottom and the front door entry) when driving forward and backward using a fall detection sensor. The fall detection sensor, for example, may be arranged in the front or rear of the cleaning robot. The cleaning robot 100 may detect the location of an object within a close distance (e.g., within 15 cm) using the PSD sensor. For example, the cleaning robot 100 may detect an object using the PSD sensor, or drive along a wall to perform cleaning. The PSD sensor, for example, may be disposed on the left and right in the forward direction outwardly by 45 degrees, or arranged in the right surface and the left surface of the cleaning robot 100.

Referring to FIG. 25, a plurality of sensors may be disposed on the front, rear, and side surfaces of the cleaning robot 100. For example, at least one ultrasonic sensor 2501 to 2504, at least one 3D sensor 2511, at least one camera 2521 (e.g., an RGB camera), and at least one of an IR stereo sensor 2531 (e.g., an IR stereo sensor for docking), PSD sensors 2541 and 2542, a LIDAR sensor 2551, or a bumper sensor 2561 may be provided. In addition, another PSD sensor (not shown) may be provided on the side of the cleaning robot 100.

Figure 26A:
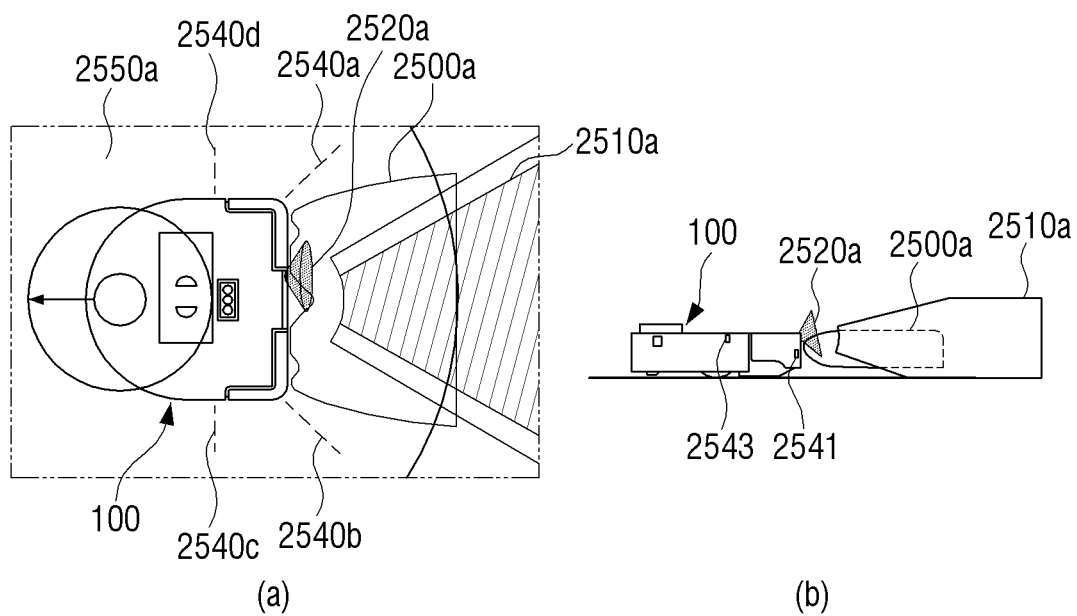

FIG. 26A and FIG. 26B are views illustrating a detection (sensing) range of a cleaning robot according to an embodiment of the disclosure.

Part (a) of FIG. 28A is a plane view illustrating the cleaning robot 100, part (b) of FIG. 26A is a side view illustrating the cleaning robot 100, and parts (c) and (d) of FIG. 26B are perspective views illustrating the cleaning robot 100.

Referring to FIG. 26A and FIG. 26B, the cleaning robot 100 may detect the object or the structure of house while driving by using a plurality of sensors.

Referring to FIG. 26A and FIG. 26B, the detection range of the 3D sensor 2511 may be a first range 2510a, the detection range of the ultrasonic sensors 2501 to 2504 may be a second range 2500a, the detection range 2541 and 2542 of the PSD sensor in the front side may be third ranges 2540a and 2540b, the detection range of the PSD sensor 2543 (not shown) on side may be fourth ranges 2540c and 2540d, and the detection range of the LIDAR sensor 2551 may be a fifth range 2550a. The view angle of the camera 2521 may be a sixth range 2520a, but is not limited thereto. The detection or capturing range may be variously predicted based on the specifications of the plurality of sensors or the locations in which a plurality of sensors are mounted.

The cleaning robot 100 may select at least one sensor among a plurality of sensors based on the recognition information of the object. The cleaning robot 100 may detect an object by using the at least one selected sensor, and obtain additional information on the object by using the detected result. The cleaning robot 100 may determine the task to be performed by the cleaning robot 100 based on the additional information on the object.

Figure 27:
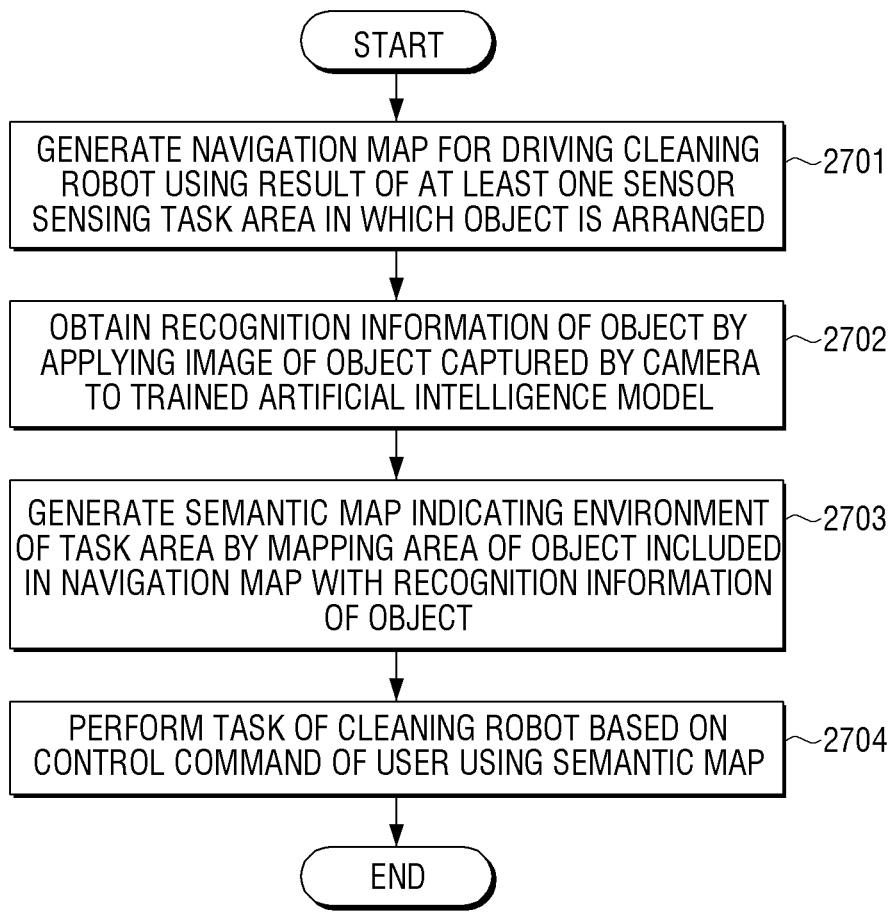
FIG. 27, FIG. 28 and FIG. 29 are flowcharts to explain a cleaning robot according to an embodiment.
Figure 28:
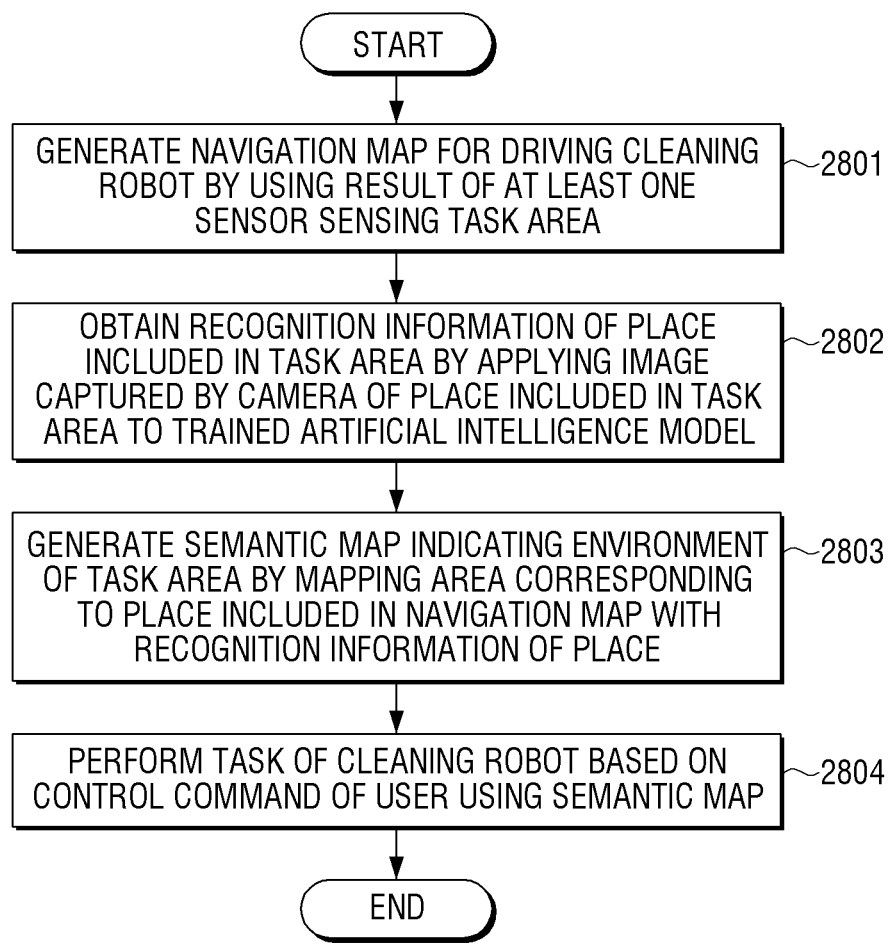
Figure 29:
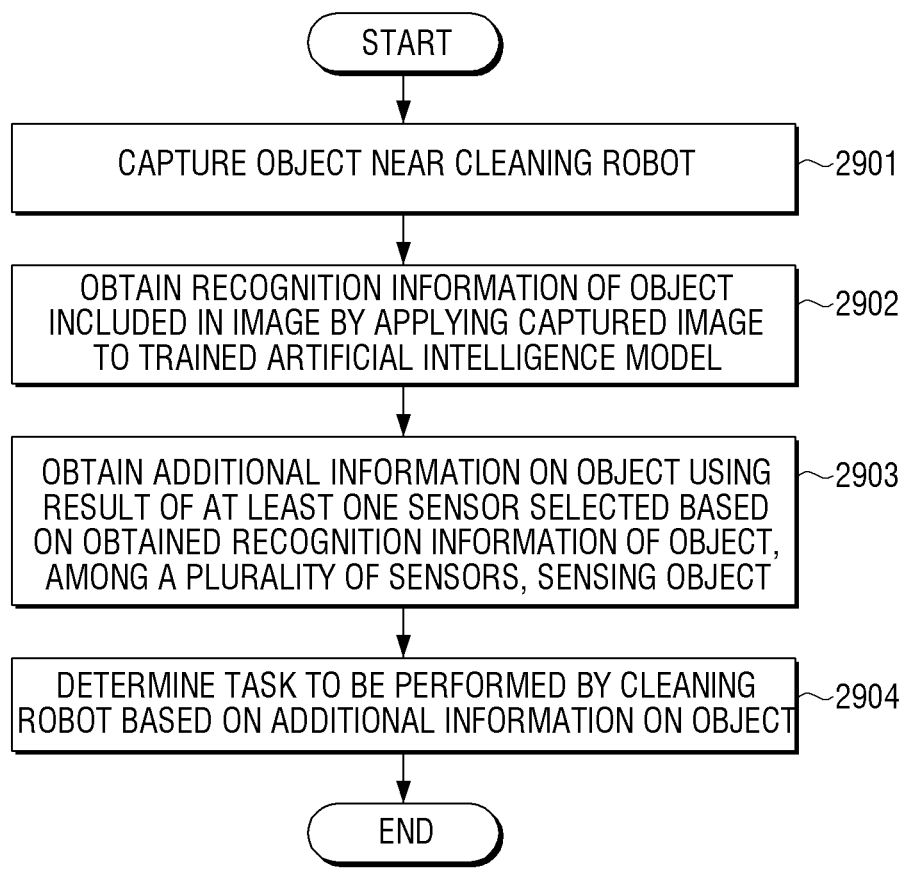

FIG. 27, FIG. 28 and FIG. 29 are flowcharts to explain a cleaning robot according to an embodiment.

Referring to FIG. 27, the cleaning robot 100 may generate a navigation map for driving the cleaning robot 100 by using the result that at least one sensor detects the task area in which the object is arranged at step S2701.

The cleaning robot 100 may obtain the recognition information of the object by applying the image of the object captured by the camera 120 to the trained artificial intelligence model at step S2702. The operation of obtaining the recognition information of the object may be performed prior to the operation that the cleaning robot 100 generates a navigation map at step S2701, or the recognition information of the object may be obtained in generating the navigation map.

The cleaning robot 100 may obtain the recognition information of the object by applying the image of the object captured by the camera 120 to the trained artificial intelligence model located in the external server.

When the recognition information of the object is obtained, the cleaning robot 100 may map the area of the object included in the navigation map with the recognition information of the object and generate a semantic map indicating the environment of the task area at step S2703.

The cleaning robot 100 may perform a task of the cleaning robot based on the control command of the user by using a semantic map at step S2704. The control command of the user may be a command for requesting execution of the task with respect to the object area or the specific place.

The cleaning robot 100 may obtain the recognition information of each place in the task area. The cleaning robot 100 may generate a semantic map indicating the environment of the task area by using the obtained recognition information of each place and the mapped recognition information of the object.

The cleaning robot 100 may generate a semantic map indicating the environment of the task area by mapping the area of the object included in the navigation map with the recognition information of the object based on at least one of the location or the form of the object according to the result of detecting the object.

The cleaning robot 100 may identify the boundary of the object corresponding to the object in the navigation map. The cleaning robot 100 may map the area of the object determined by the boundary of the object with the recognition information of the object to generate a semantic map indicating the environment of the task area.

The cleaning robot 10 may detect the object by using at least one sensor selected based on the recognition information of the object, among a plurality of sensors included in the sensor 110. The cleaning robot 100 may obtain additional information on the object by using the result detected by at least one sensor.

The cleaning robot 100 may set a priority for a plurality of sensors according to the recognition information of the object. The cleaning robot 100 may obtain additional information with respect to the object by using the result detected by at least one sensor according to a priority, among the plurality of sensors.

FIG. 28 is a flowchart to explain a cleaning robot according to another embodiment of the disclosure;

Referring to FIG. 28, the cleaning robot 100 may generate a navigation map for driving the cleaning robot 100 by using the result of at least one sensor detecting the task area at step S2801.

The cleaning robot 100 may obtain recognition information of the place included in the task area by applying the image of the place captured by the camera 120 included in the task area to the trained artificial intelligence model at step S2802.

When recognition information of the place included in the task area is obtained, the cleaning robot 100 may generate a semantic map indicating the environment of the task area by mapping the area corresponding to the place included in the navigation map with the recognition information of the place at step S2803.

The cleaning robot 100 may perform the task of the cleaning robot 100 based on the control command of the user using the semantic map at step S2804.

FIG. 29 is a flowchart to explain a cleaning robot according to an embodiment of the disclosure.

Referring to FIG. 29, the cleaning robot 100 may capture the object near the cleaning robot 100 at step S2901.

The cleaning robot 100 may obtain recognition information of the object included in the image by applying the captured image to the trained artificial intelligence model at step S2902. For example, the cleaning robot 100 may obtain recognition information of the object by applying the captured image to the trained artificial intelligence model located in the external server.

The cleaning robot 100 may obtain the additional information on the object using the result detected by at least one sensor selected based on the obtained recognition information of the object, among a plurality of sensors, at step S2903.

For example, the cleaning robot 100 may obtain additional information on the object by selectively using the result detected by the at least one sensor selected based on the recognition information of the object, among detection results detected by the plurality of sensors within a predetermined time (e.g., 10 ms) based on a predetermined period of time. At least one sensor selected based on the recognition information of the object may include one or a plurality of sensors. When the plurality of sensors are selected based on the recognition information of the object, the plurality of selected sensors may have priorities. The cleaning robot 100 may give a weighted value to the detection result having a highest priority to obtain additional information on the object.

When a priority is set to be higher to the IR stereo sensor among a plurality of sensors, the cleaning robot 100 may obtain additional information on the object by giving a weighted value to the result detected by the IR stereo sensor to obtain additional information on the object. To be specific, the cleaning robot 100 may determine the bounding box for the object, and with respect to the area in which the determination result of the bounding box does not coincide with the object detection result through the IR stereo sensor, reduce a threshold value of the IR stereo sensor to detect the object.

The cleaning robot 100 may set the priorities for a plurality of sensors according to the recognition information of the object, and obtain additional information on the object by using the result detected by at least one sensor according to the priority among the plurality of sensors.

When a priority is given to be higher to the LIDAR sensor among a plurality of sensors according to the recognition information of the object, the cleaning robot 100 may give a weighted value to the result detected by the LIDAR sensor to obtain the additional information on the object.

When a priority is given to be higher to the ultrasonic sensor among the plurality of sensors according to the recognition information of the object, the cleaning robot 100 may give a weighted value to the result detected by the ultrasonic sensor and obtain additional information on the object. When a priority is given higher to the ultrasonic sensor among the plurality of sensors according to the recognition information of the object, the recognized object may be transparent or black.

Based on the addition information on the object, the cleaning robot 100 may determine the task to be performed by the cleaning robot 100 at step S2904.

Various embodiments of the disclosure may also be implemented in a mobile device. The mobile device may be, for example, embodied in various forms such as a service robot for a public place, a transport robot at a production site, an operator-assisted robot, a housekeeping robot, a security robot, an auto-driving vehicle, or the like.

In this case, the task of the disclosure can be a task according to the purpose of the mobile device. For example, if the task of the cleaning robot is to avoid an object or inhale dust in a house, the task of an operator-assisted robot may be avoiding or moving an object. In addition, the task of the security robot may be avoiding an object, detecting an intruder to provide an alarm, or photographing the intruder. Further, the task of the auto-driving vehicle may be avoiding another vehicle or obstacle, or controlling a steering device or an acceleration/deceleration device.

The term "module", as used in this disclosure, may include units embodied in hardware, software, or firmware, and may be used compatible with the terms such as logic, logic block, component, circuit, or the like. The module may be an integrally constructed component or a minimum unit of the component or part thereof that performs one or more functions. For example, according to an embodiment, the module may be implemented in the form of an application-specific integrated circuit (ASIC).

Various embodiment of the disclosure may be embodied as software including commands stored in machine-readable storage media. The machine may be an apparatus that calls a command stored in a storage medium and is operable according to the called command, including an electronic apparatus in accordance with the disclosed example embodiments (e.g., an electronic apparatus (A)). When the command is executed by a processor, the processor may perform the function corresponding to the command, either directly or under the control of the processor, using other components.

Various embodiments of the disclosure may be implemented as software (e.g., a program) that includes one or more instructions stored in a storage medium (e.g., memory 130, memory on the server (not shown)) that is readable by a machine (not shown) (e.g., the cleaning robot 100, and a server (not shown) communicating with the cleaning robot 100). For example, a processor of the device (e.g., processor 140, a processor of the server (not shown)) may call and execute at least one of the stored one or more instructions from a storage medium. This enables the device to be operated to perform at least one function in accordance with the at least one called command being called. The command may include code generated or executed by a compiler or an interpreter. The machine-readable storage medium may be provided in the form of a non-transitory storage medium. The 'non-temporary' means that the storage medium does not include a signal (e.g., electromagnetic wave), and is tangible, but does not distinguish whether data is stored semi-permanently or temporarily on a storage medium.

According to an embodiment, the method according to various embodiments disclosed herein may be provided in a computer program product. A computer program product may be traded between a seller and a purchaser as a commodity. A computer program product may be distributed in the form of a machine-readable storage medium (e.g., compact disc read only memory (CD-ROM)) or distributed online (e.g., download or upload) between two user devices (e.g., smartphones) through an application store (e.g., PlayStore™) In the case of on-line distribution, at least a portion of the computer program product may be temporarily stored, or temporarily created, on a storage medium such as a manufacturer's server, a server of an application store, or a memory of a relay server.

Each of the components (e.g., modules or programs) according to various embodiments may consist of a single entity or a plurality of entities, and some subcomponents of the abovementioned subcomponents may be omitted, or other components may be further included in various embodiments. Alternatively or additionally, some components (e.g., modules or programs) may be integrated into one entity to perform the same or similar functions performed by each component prior to integration. Operations performed by modules, programs, or other components, in accordance with various embodiments, may be executed sequentially, in parallel, repetitively, or heuristically, or at least some operations may be performed in a different order, or omitted, or another function may be further added.

Although exemplary embodiments have been shown and described, it will be appreciated by those skilled in the art that changes may be made to these exemplary embodiments without departing from the principles and spirit of the present disclosure. Accordingly, the scope of the present invention is not construed as being limited to the described exemplary embodiments, but is defined by the appended claims as well as equivalents thereto.

What is claimed is:

1. A cleaning robot comprising:
at least one sensor;
at least one camera;
a driver; and
at least one processor configured to:
    by inputting an image photographed by the at least one camera to a trained artificial intelligence model, obtain information regarding an object included in the photographed image;
    obtain information sensed by the at least one sensor;
    obtain recognition information regarding an area of a plurality of areas using the obtained information regarding the object, wherein the recognition information regarding the area of the plurality of areas comprises information regarding a type of the area of the plurality of areas;
    generate a map displaying the plurality of areas using the obtained information regarding the object, the sensed information and the recognition information regarding the area of the plurality of areas;
    based on a user voice instructing a cleaning operation regarding an area from among the plurality of areas, control the driver to move the cleaning robot to the area from among the plurality of areas; and
    based on moving of the cleaning robot to the area from among the plurality of areas, perform the cleaning operation regarding the area from among the plurality of areas,
wherein the user voice comprises information regarding the cleaning operation and recognition information regarding the area from among the plurality of areas, and
wherein the map includes the information regarding the type of the area of the plurality of areas.

2. The cleaning robot as claimed in claim 1, wherein the user voice includes a word referring to the area from among the plurality of areas and a word indicating a performance operation of the cleaning robot, and
wherein the word referring to the area from among the plurality of areas matches the recognition information regarding the area from among the plurality of areas.

3. The cleaning robot as claimed in claim 1, wherein the at least one processor is configured to, based on a user command designating an area from among the plurality of areas as an avoidance area being received from an external terminal device through a communication interface, control the driver to move the cleaning robot toward remaining areas excluding the avoidance area.

4. The cleaning robot as claimed in claim 1, wherein the map is displayed by an external terminal device connected to the cleaning robot, and
wherein the map includes a text or an icon indicating recognition information regarding the plurality of areas.

5. The cleaning robot as claimed in claim 1, wherein the at least one sensor includes at least one of an IR stereo sensor, an infrared sensor, a LIDAR sensor, or a PSD sensor.

6. A controlling method of a cleaning robot including at least one sensor and at least one camera, the method comprising:

by inputting an image photographed by the at least one camera to a trained artificial intelligence model, obtaining information regarding an object included in the photographed image;

obtaining information sensed by the at least one sensor;

obtaining recognition information regarding an area of a plurality of areas using the obtained information regarding the object, wherein the recognition information regarding the area of the plurality of areas comprises information regarding a type of the area of the plurality of areas;

generating a map displaying the plurality of areas using the obtained information regarding the object, the sensed information and the recognition information regarding the area of the plurality of areas;

based on a user voice instructing a cleaning operation regarding an area from among the plurality of areas, moving the cleaning robot to the area from among the plurality of areas; and based on moving of the cleaning robot to the area from among the plurality of areas, performing the cleaning operation regarding the area from among the plurality of areas, wherein the user voice comprises information regarding the cleaning operation and recognition information regarding the area from among the plurality of areas, and wherein the map includes the information regarding the type each the area of the plurality of areas.

7. The method as claimed in claim 6, wherein the user voice includes a word referring to the area from among the plurality of areas and a word indicating a performance operation of the cleaning robot, and wherein the word referring to the area from among the plurality of areas matches the recognition information regarding the area from among the plurality of areas.

8. The method as claimed in claim 6, comprising:

based on a user command designating an area from among the plurality of areas as an avoidance area being received from an external terminal device through a communication interface, moving the cleaning robot toward remaining areas excluding the avoidance area.

9. The method as claimed in claim 6, wherein the map is displayed by an external terminal device connected to the cleaning robot, wherein the map includes a text or an icon indicating recognition information regarding the plurality of areas.

10. The method as claimed in claim 6, wherein the at least one sensor includes at least one of an IR stereo sensor, an infrared sensor, a LIDAR sensor, or a PSD sensor.

* * * * *